(12) United States Patent
Tanikawa et al.

(10) Patent No.: US 11,390,507 B2
(45) Date of Patent: Jul. 19, 2022

(54) TRAVELING CONTROL METHOD AND TRAVELING CONTROL DEVICE FOR AERIAL WORK PLATFORM

(71) Applicant: HOKUETSU INDUSTRIES CO., LTD., Tsubame (JP)

(72) Inventors: Katsumi Tanikawa, Tsubame (JP); Norihide Ikarashi, Tsubame (JP); Masahiko Watanabe, Tsubame (JP)

(73) Assignee: HOKUETSU INDUSTRIES CO., LTD., Niigata (JP)

( * ) Notice: Subject to any disclaimer, the term of this patent is extended or adjusted under 35 U.S.C. 154(b) by 279 days.

(21) Appl. No.: 16/765,811

(22) PCT Filed: Dec. 26, 2017

(86) PCT No.: PCT/JP2017/046612
§ 371 (c)(1),
(2) Date: May 20, 2020

(87) PCT Pub. No.: WO2019/130421
PCT Pub. Date: Jul. 4, 2019

(65) Prior Publication Data
US 2020/0385256 A1    Dec. 10, 2020

(51) Int. Cl.
*B66F 11/04* (2006.01)
*B66F 17/00* (2006.01)
(Continued)

(52) U.S. Cl.
CPC .......... *B66F 11/046* (2013.01); *B66F 17/006* (2013.01); *B62D 6/002* (2013.01);
(Continued)

(58) Field of Classification Search
CPC ...... B62D 15/00; B62D 15/02; B62D 15/025; B62D 6/00; B62D 6/002; B62D 7/00;
(Continued)

(56) References Cited

U.S. PATENT DOCUMENTS

| | | | |
|---|---|---|---|
| 2003/0106725 A1* | 6/2003 | Irikura | B62D 11/183 180/6.26 |
| 2008/0097666 A1* | 4/2008 | Oba | B66F 9/07568 701/41 |
| 2012/0046835 A1* | 2/2012 | Matsumoto | B62D 6/002 701/41 |

FOREIGN PATENT DOCUMENTS

| | | |
|---|---|---|
| JP | 09-294779 A | 11/1997 |
| JP | 2005-112300 A | 4/2005 |

(Continued)

OTHER PUBLICATIONS

International Search Report corresponding international application PCT/JP2017/046612 dated Mar. 13, 2018, 4 pages.

*Primary Examiner* — Charles J Han
(74) *Attorney, Agent, or Firm* — Ronald M. Kachmarik; Cooper Legal Group LLC

(57) ABSTRACT

Reduction of minimum turning radius of an aerial work platform. Drive motors are provided to driven wheels of the platform respectively, so that the driven wheels can be independently controlled in terms of rotational speed and rotation direction. When the steering angle of steered wheels is at most a first steering angle, constant velocity control is performed, driving both of the driven wheels in the same rotation direction and at the same rotational speed. When the steering angle exceeds the first steering angle and is at most a second steering angle, differential control is performed, reducing the rotational speed of the driven wheel on the inside in the turning direction relative to the driven wheel on the outside in the turning direction. When the steering angle exceeds the second steering angle, counter-rotation control is performed, counter-rotating the driven wheel that is on the inside in the turning direction.

20 Claims, 13 Drawing Sheets

(51) Int. Cl.
   *B62D 6/00* (2006.01)
   *B62D 15/02* (2006.01)
   *B66F 9/24* (2006.01)

(52) U.S. Cl.
   CPC .............. *B62D 15/025* (2013.01); *B66F 9/24* (2013.01); *B66F 2700/09* (2013.01)

(58) Field of Classification Search
   CPC ... B62D 7/06; B62D 9/00; B66F 11/00; B66F 11/04; B66F 11/042; B66F 11/044; B66F 11/046; B66F 17/00; B66F 17/006; B66F 2700/00; B66F 2700/09; B66F 7/00; B66F 7/06; B66F 7/065; B66F 7/0666; B66F 9/00; B66F 9/06; B66F 9/075; B66F 9/20
   See application file for complete search history.

(56) References Cited

FOREIGN PATENT DOCUMENTS

| | | |
|---|---|---|
| JP | 2007-38778 A | 2/2007 |
| JP | 2010-260447 A | 11/2010 |

* cited by examiner

FIG. 7

```
┌─────────────────────────────────────────────────┐
│ The steering dial 14 is rotated in a clockwise  │
│ direction, from a state in which the steering   │
│ dial 14 is at the neutral position and the      │
│ steered wheels 33a, 33b are at the straight     │
│ ahead position                                  │
└─────────────────────────────────────────────────┘
```

- B1: The controller 70 receives the rotation angle input by clockwise operation of the steering dial 14
- B2: The controller 70 sets a positive (+) target rudder angle
- B3: The controller 70 acquires "0" as a rudder angle detected by the rudder angle detector 17
- B4: The controller 70 computes a positive (+) value difference by subtracting the rudder angle "0" from the positive (+) target rudder angle
- B5: The controller 70 switches the direction switching valve 523 to the position A to extend the hydraulic cylinder 515

What is the value of the difference?
- Negative (−) → B7: Contracting the hydraulic cylinder 515 by switching the direction switching valve 523 to the position B
- 0 → B6: Stopping the hydraulic cylinder 515 by switching the direction switching valve 523 to the position C
- Positive (+) → (loop back to B5)

- The steering dial 14 is controlled to return to the neutral position again
- B8: The controller 70 computes a negative (−) difference by subtracting the positive (+) detected rudder angle from the rudder angle "0"
- B9: Contracting the hydraulic cylinder 515 by switching the switching valve 523 to the position B

TRAVELING CONTROL METHOD AND TRAVELING CONTROL DEVICE FOR AERIAL WORK PLATFORM

FIELD OF THE INVENTION

The present invention relates to a travel control method and travel control device for a mobile aerial work platform, and more particularly relates to a travel control method and travel control device for a mobile aerial work platform that are capable of improving turning capabilities of the mobile aerial work platform.

BACKGROUND OF THE INVENTION

A scaffold has hitherto been assembled at building sites for aerial work such as, for example, ceiling construction, and lighting installation or painting work performed on a ceiling (including behind the ceiling) and at high wall locations. However, most recently drivable mobile (self-propelled) aerial work platforms are often being employed in order to achieve labor-savings and safety in such work.

Such a drivable mobile aerial work platform includes a vehicle chassis equipped with a traction unit such as wheels or crawlers, and, mounted on the vehicle chassis, with a deck to raise or lower an operator or the like being carried thereon and a lift unit to raise and lower the deck. A drivable mobile aerial work platform equipped with a traction unit configured by wheels or the like driven by a motor has high maneuverability and is easy to operate, and so is widely used for internal electrical work and internal decoration.

The traction unit of such a mobile aerial work platform is, for example, generally configured with steered wheels for the front wheels and driven wheels for the rear wheels. The mobile aerial work platform generally travels by driving the driven wheels with a motor, and has a configuration in which a forward travel direction thereof can be changed by steering the steered wheels with a steering actuator such as a hydraulic cylinder, motor, or the like (see Patent Document 1).

RELATED ARTS DOCUMENTS

[Patent Document 1] Publication of Japanese Laid Open to Public 2007-38778

SUMMARY OF THE INVENTION

Problems to be Solved by the Invention

Due to a mobile aerial work platform sometimes needing to perform work in a comparatively confined work space, preferably a minimum turning radius is designed to enable a tight turn to be performed even in a highly confined space.

In an attempt to reduce the minimum turning radius of such a mobile aerial work platform, consideration might be given to designing a large maximum rudder angle for the steered wheels.

However consider, as illustrated in FIG. 11, a mobile aerial work platform including a vehicle chassis 130 equipped with steered wheels as front wheels 133a, 133b and driven wheels as rear wheels 133c, 133d. Since each of the wheels 133a to 133d will attempt to move forward in the direction in which they are each facing, in a situation in which the rudder angle of steered wheels 133a, 133b is increased so as to be close to 90°, this results in the direction the driven wheels 133c, 133d are trying to move in diverging greatly from the direction the steered wheels 133a, 133b are trying to move in, and intersecting in a nearly orthogonal state. The force from rotation of the driven wheels 133c, 133d trying to push the vehicle chassis 130 forward accordingly receives a large resistance from the steered wheels 133a, 133b making travel difficult, with the driven wheels 133c, 133d slipping, stopping, or the like.

Thus during turning, in order to rotate each of the wheels 133a to 133d smoothly and to achieve smooth traveling, for example as illustrated in FIG. 12, a configuration results in which a position where an extension line E1 of shafts of the driven wheels (rear wheels) 133c, 133d intersects with extension lines E2, E3 of shafts of the steered wheels (front wheels) 133a, 133b acts as a turning center C, and the wheels 133a to 133d respectively travel along concentric circular paths orb A to orb D with the turning center C at the center.

During travel of the mobile aerial work platform in such a case, the driven wheels 133c, 133d are each rotated in the forward direction, and so even if the distance between the wheel driven at inside to the turn direction (the driven wheel 133c in the example of FIG. 12) and the turning center C is shortened excessively in an attempt to make the wheel driven at inside to the turn direction 133c travel along a circular path orb C having a small radius, the driven wheel 133c is not actually able to travel along the circular path orb C, resulting in the travel path straying outside the travel path, and in the turning radius of the mobile aerial work platform becoming larger.

There is accordingly a need to secure a required distance "L min" between the wheel driven at inside to the turn direction 133c and the turning center C in order to form the circular path orb C required to allow the wheel driven at inside to the turn direction 133c to travel without difficulty. This puts a prescribed cap on the maximum rudder angle obtainable by the steered wheels 133a, 133b due to needing to place the turning center C at a position that is at least the distance Limn from the wheel driven at inside to the turn direction 133c. This means that the maximum rudder angle of the steered wheels 133a, 133b is accordingly not able to be increased to near to 90°.

Note that making the spacing shorter between the steered wheels that are the front wheels 133a, 133b and the driven wheels that are the rear wheels 133c, 133d (a wheelbase) might be considered as a method to make the minimum turning radius of the vehicle chassis 130 smaller However, with a mobile aerial work platform, in order to secure stability when the deck (work platform) is raised in use, and to reduce any danger of falling over etc., the spacing between the front and rear wheels (the wheelbase), and the spacing between the left and right wheels (the tread), are preferably made as wide as possible. This means that stability is sacrificed by the configuration described above in which the wheelbase is shortened.

Moreover, even suppose that the wheelbase were to be shortened, in order to cause the wheel driven at inside to the turn direction to travel smoothly, there is still a need to secure the distance Limn described above between the wheel driven at inside to the turn direction and the turning center. Thus, even adopting such a configuration does not enable the minimum turning radius to be significantly reduced.

Note that the inventors of the present invention have, in the process of completing the present invention, investigated a configuration, in which instead of providing wheels that are separately either a steered wheel or a driven wheel, an inner wheel motor M is attached to the inside of each of the front wheels 233a, 233b serving as the steered wheels as illustrated in FIG. 13, so that the front wheels 233a, 233b are operated as both of a steered wheel and a driven wheel.

In this configuration the rear wheels 233c, 233d are each able to rotate freely, and so an improvement in turning capabilities is expected in comparison to the configurations illustrated in FIG. 11 and FIG. 12 in which the front wheels are steered wheels and the rear wheels are driven wheels.

However, in this mobile aerial work platform, a configuration is adopted in which, as described above, the wheels 233a to 233d are provided at the four corners of the vehicle chassis 130 in plan view in order to secure stability when the deck (work platform) has been raised.

Thus in a configuration in which an in-wheel motor M is provided to each of the left and right steered wheels 233a, 233b, the in-wheel motors M also swing accompanying steering of the steered wheels 233a, 233b. Thus, the in-wheel motor M attached to the turn direction inside steered wheel 233a sticks out forwards from under the vehicle chassis when the steered wheels 233a, 233b are steered at a large rudder angle, as illustrated in FIG. 13.

As a result, the overall length of the vehicle chassis 130 is lengthened by the length of the protruding portion of the in-wheel motor M. There is accordingly a concern that when the mobile aerial work platform is being turned in a constricted space, the mobile aerial work platform might not be able to turn due to contacting with an obstacle from the in-wheel motor M that protrudes in front of the vehicle chassis 130, as well as from any electrical cables, hydraulic hoses, etc. connected to this in-wheel motor M. There is also a concern that even if turning could be achieved, due to contact with the obstacle, there might still be damage to the in-wheel motor M, and line breaks, cuts, or the like might occur in the electrical cables and hydraulic hoses connected to the in-wheel motor M.

Moreover, in cases in which a motor cover or the like is attached to protect the in-wheel motor M protruding in front of the vehicle chassis 130, then the overall length of the vehicle chassis 130 during turning would be further lengthened, which is detrimental to tight turns in confined spaces.

Thus in order to eliminate the deficiencies of the related art as described above, while maintaining a configuration adopted for traction units in known mobile aerial work platforms in which steered wheels are employed for the front wheels and driven wheels are employed for the rear wheels, an object of the present invention is to provide a travel control method and travel control device for a mobile aerial work platform that are capable of significantly reducing a minimum turning radius, while at the same time avoiding motors and electrical cables, hydraulic hoses etc. exposed from a lower portion of the vehicle chassis impacting obstacles etc. being damaged or the like, even at large maximum rudder angles, while still adopting a configuration in which the wheels are separately either a steered wheel or driven wheel.

SUMMARY OF THE INVENTION

Means for Solving the Problem

Means for solving the problems are described below with reference numerals used in the detailed description of the preferred embodiments. These reference numerals are intended to clarify the correspondence between the descriptions in the claims and the descriptions in the detailed description of the preferred embodiments, and it is needless to say that these reference numerals should not be used to restrictively interpret the technical scope of the present invention.

In order to achieve the object, a travel control method for a mobile aerial work platform 2 including a vehicle chassis 30 capable of travelling, and mounted on the vehicle chassis 30 an elevating deck 10 and a lift unit 20 to raise and lower the deck 10, the vehicle chassis 30 being equipped with a pair of steered wheels 33a, 33b provided at one end side in a travel direction and with a pair of driven wheels 33c, 33d provided at another end side in the travel direction of the vehicle chassis 30, and the mobile aerial work platform 2 being configured so as to be capable of performing a turning action by steering of the steered wheels 33a, 33b, the travel control method comprises:

providing each of the driven wheels 33c, 33d with drive motors 351, 352 to drive the driven wheels 33c, 33d in a manner that enables independent control of a rotation speed and a rotation direction of each of driven wheels 33c, 33d;

performing equivalent speed control in cases in which a rudder angle θ of the steered wheels 33a, 33b with respect to a straight ahead position (0 degree) is less than or equal to a predetermined first rudder angle (for example, ±6 degree), so as to drive the pair of driven wheels 33c, 33d in the same rotation direction and at the same rotation speed as each other;

performing differential control in cases in which the rudder angle θ of the steered wheels 33a, 33b exceeds the first rudder angle but is less than or equal to a second rudder angle (for example, ±54 degrees) larger than the first rudder angle (for example, ±6 degrees), so as to drive the pair of driven wheels 33c, 33d at a predetermined rotation speed difference in which a rotation speed of a turn direction inside driven wheel is slower than a rotation speed of a turn direction outside driven wheel, while continuing to drive the pair of driven wheels 33c, 33d in the same rotation direction as each other; and performing reverse rotation control in cases in which the rudder angle θ of the steered wheels 33a, 33b exceeds the second rudder angle (for example, ±54 degrees), so as to reverse rotate the wheel driven at inside to the turn direction.

Preferably, during the differential control and the reverse rotation control, a rotation speed of the turn direction outside driven wheel is reduced in speed as the rudder angle θ gets larger.

Preferably, in the differential control, the rotation speed difference is increased as the rudder angle θ gets larger.

Furthermore, in the reverse rotation control, a reverse rotation speed is preferably increased for the wheel driven at inside to the turn direction as the rudder angle θ gets larger.

Preferably, the rudder angle θ of the steered wheel employs a rudder angle of a turn direction inside steered wheel.

Moreover, a travel control device 1 for a mobile aerial work platform 2 including a vehicle chassis 30 capable of travelling, and, mounted on the vehicle chassis 30, an elevating deck 10, and a lift unit 20 to raise and lower the deck 10, a pair of steered wheels 33a, 33b being provided at one end side in a travel direction of the vehicle chassis 30 and a pair of driven wheels 33c, 33d being provided at another end side in the travel direction of the vehicle chassis 30, with the mobile aerial work platform 2 configured so as to be capable of performing a turning action by steering the steered wheels 33a, 33b, the travel control device 1 comprises:

a steering input device (steering dial) 14 to input a steering direction in which to face the steered wheels 33a, 33b for example by rotating a dial or the like;

a steering mechanism 50 equipped with a steering actuator (hydraulic cylinder) 515 to steer the steered wheels 33a, 33b;

a travel input device (travel lever) 15 to input commands of forward, backward, and stop, and to input a travel speed employed during forward and backward travel;

a drive unit 35 equipped with a pair of drive motors 351, 352 to independently drive each of the driven wheels 33c, 33d; and a controller 70 to control the steering mechanism 50 and the drive unit 35;

wherein the controller 70 controls the steering mechanism 50 so that the steering actuator 515 steers the steered wheels 33a, 33b with steering corresponding to operation of the steering input device 14, and also controls the drive unit 35 according to input performed through the travel input device 15 in accordance with a rudder angle θ of the steered wheels 33a, 33b with respect to a straight ahead position (0 degree); and control of the drive unit 35 by the controller 70 causes the drive unit 35 to execute equivalent speed control in cases in which the rudder angle θ of the steered wheels 33a, 33b is less than or equal to a predetermined first rudder angle (as an example, ±6 degrees), so as to drive both of the drive motors 351, 352 to drive the pair of driven wheels 33c, 33d in a same rotation direction and at a same rotation speed in accordance with a forward travel direction and a travel speed input using the travel input device 15;

causes the drive unit 35 to execute differential control in cases in which the rudder angle θ of the steered wheel exceeds the first rudder angle (as an example, ±6 degrees) but is less than or equal to a second rudder angle (as an example, ±54 degrees) larger than the first rudder angle, so as to drive the drive motors 351, 352 at a predetermined rotation speed difference in which a rotation speed of a turn direction inside driven wheel is slower than a rotation speed of a turn direction outside driven wheel, while continuing to drive the pair of driven wheels 33c, 33d in the same rotation direction as each other; and causes the drive unit 35 to execute reverse rotation control in cases in which the rudder angle θ of the steered wheels 33a, 33b exceeds the second rudder angle (as an example, ±54 degrees), so as to drive the drive motors 351, 352 such that a turn direction inside driven wheel alone is rotated in reverse with respect to the travel direction.

Note that in the present specification reference to "rotation" means an action centered on an axial position, and is not limited to an action in a clockwise direction or a counterclockwise direction, such as for a dial, but also includes an action in two dimensions, such as in a front-rear direction or a left-right direction of an axially supported lever.

The travel control device 1 further comprises:

a rudder angle detector 17 to detect a rudder angle θ of the steered wheels 33a, 33b with respect to a straight ahead position (0 degree); and wherein the controller 70 controls the drive unit 35 using a detected rudder angle detected by the rudder angle detector 17 as the rudder angle θ of the steered wheels.

Alternately, the steering input device 14 may be configured so as to enable input of a rudder angle in which to face the steered wheels 33a, 33b with respect to a straight ahead position; and the controller 70 controls the drive unit 35 using a rudder angle θ input by the steering input device 14 as the rudder angle θ of the steered wheel.

Preferably, during the differential control and the reverse rotation control, the controller 70 controls the drive unit 35 so as to lower a rotation speed of the turn direction outside driven wheel as the rudder angle θ of the steered wheels 33a, 33b gets larger.

Preferably, in differential control, the controller 70 controls the drive unit 35 such that the rotation speed difference is increased as the rudder angle θ of the steered wheels 33a, 33b get larger.

Moreover, preferably, in reverse rotation control, the controller 70 controls the drive unit 35 such that a reverse rotation speed of the wheel driven at inside to the turn direction is increased as the rudder angle θ of the steered wheels 33a, 33b get larger.

Preferably, the steering input device 14 is a steering dial; and the controller 70 controls the steering mechanism 50 such that a rotation angle of the steering dial with respect to a neutral position is caused to match a rudder angle of the turn direction inside steered wheel with respect to a straight ahead position.

Advantageous Effects of Invention

The configuration of the present invention as described above enables the following significant advantageous effects to be obtained in a mobile aerial work platform controlled by the travel control method of the present invention.

When the rudder angle θ of the steered wheels 33a, 33b with respect to a straight ahead position (0°) is less than or equal to a predetermined first rudder angle (±6° for example), then equivalent speed control is performed to drive the pair of driven wheels 33c, 33d in the same rotation direction and at the same rotation speed. In a range in which the rudder angle θ exceeds the first rudder angle (±6° for example) but is less than or equal to a second rudder angle (±54°, for example), then differential control is performed to drive the pair of driven wheels 33c, 33d such that there is a predetermined rotation speed difference in which, while continuing to drive the pair of driven wheels 33c, 33d in the same direction as each other, the rotation speed of the wheel driven at inside to the turn direction is made slower than the rotation speed of the turn direction outside driven wheel. In cases in which the rudder angle θ exceeds the second rudder angle (±54°, for example), then reverse rotation control is performed to rotate the wheel driven at inside to the turn direction in reverse, so that while maintaining a configuration in which steered wheels are employed as the front wheels and driven wheels are employed as the rear wheels, the mobile aerial work platform is able to turn around easily even in a confined space due to being able to significantly reduce the minimum turning radius.

In particular, by reverse rotating the wheel driven at inside to the turn direction when the second rudder angle (±54°, for example) is exceeded, then when the steered wheel (the turn direction inside steered wheel 33a) has been steered at 90° as illustrated in FIG. 2B, a turning center C can be placed more toward the turn direction outside (the driven wheels 33d side) than the wheel driven at inside to the turn direction 33c. As a result, this enables the minimum turning radius to be significantly reduced in comparison to mobile aerial work platforms hitherto.

BRIEF EXPLANATION OF ATTACHED DRAWINGS

FIG. 2 illustrate a vehicle chassis equipped with a travel control device of the present invention.

FIG. 7 is a flowchart illustrating an example of steering control for a case in which a steering dial has been returned to a position neutral after being rotated to the right from a neutral position.

EMBODIMENTS

Next, description follows regarding a travel control device 1 of a mobile aerial work platform 2 of the present invention, with reference to the appended drawings.

Overall Configuration of Mobile Aerial Work Platform

Figure 1:
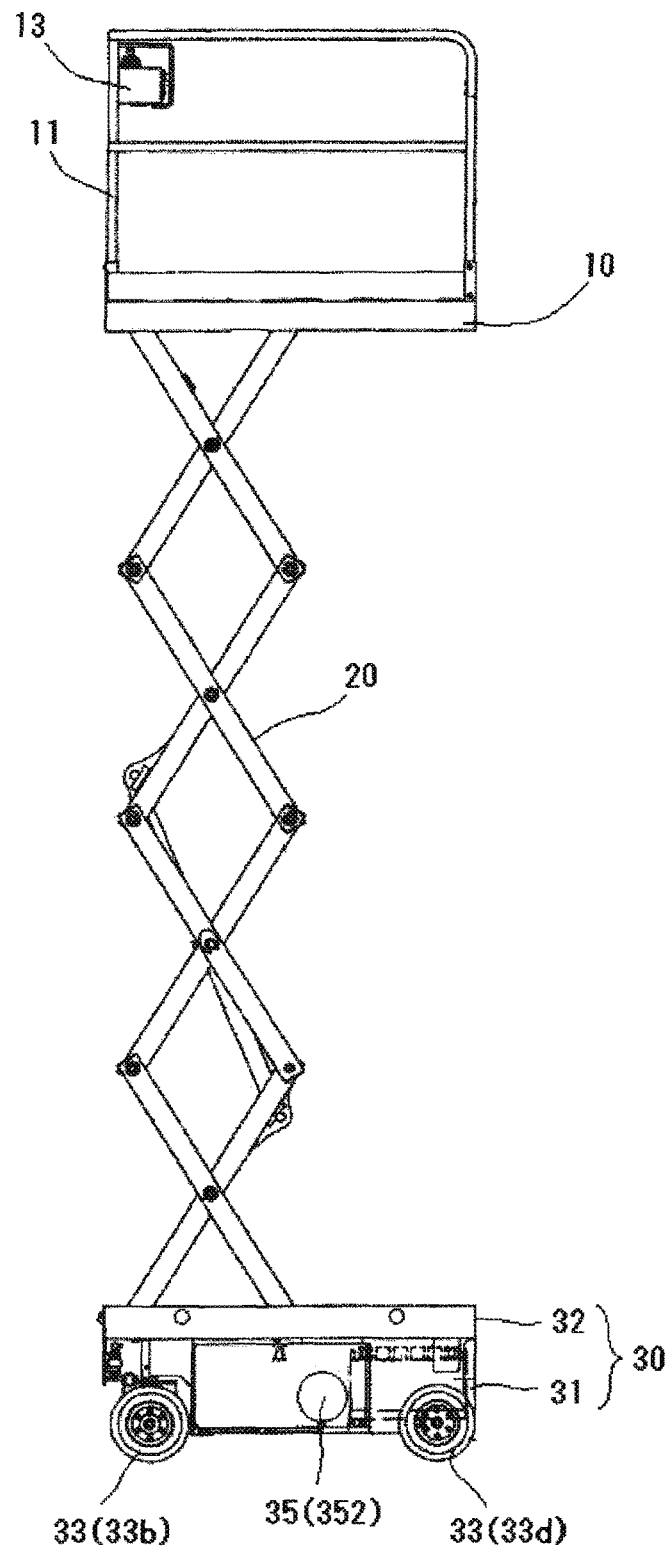
FIG. 1 is a front view illustrating an overall configuration of a mobile aerial work platform.

An example of an overall configuration of the mobile aerial work platform 2 to which the travel control device 1 of the present invention is mounted is illustrated in FIG. 1.

The mobile aerial work platform 2 illustrated in FIG. 1 is equipped with an elevating deck 10, and a lift unit 20 to raise and lower the deck 10, installed on a vehicle chassis 30 including wheels 33.

The deck 10 carrying an operator or a load etc. is raised or lowered. Falls of the operator or the like being carried on the deck 10 are prevented in the illustrated exemplary embodiment by providing a guard fence 11 around the deck.

The lift unit 20 for raising and lowering the deck 10 may employ various known structures, as long as the deck 10 carrying the operator can be raised or lowered. In the example of the present exemplary embodiment, the lift unit 20 provided is configured by a scissor link mechanism and a hydraulic cylinder.

The above described vehicle chassis 30 for mounting the lift unit 20 and the deck 10 is equipped with a box shaped vehicle body 31, functioning as a casing to house required equipment such as a drive motor 35 (351, 352), battery (not illustrated in the drawings) and the like, and with a frame 32 mounted on the vehicle body 31. A bottom end of the lift unit 20 configured by the above scissor link mechanism is attached onto the vehicle chassis 30 through the frame 32.

Figure 2A:
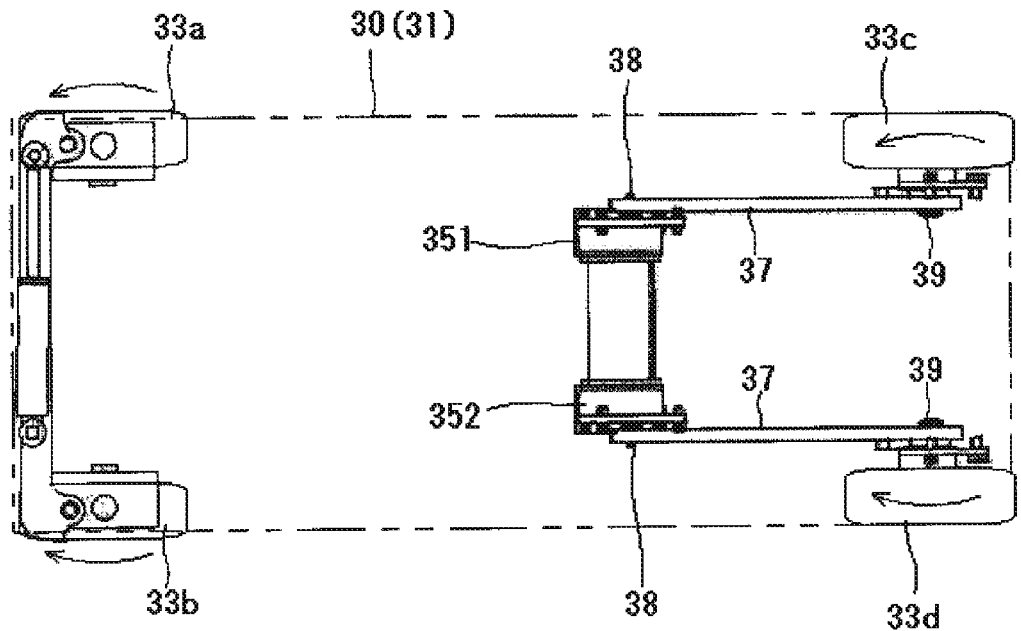
FIG. 2A is a plan view when proceeding straight ahead.
Figure 2B:
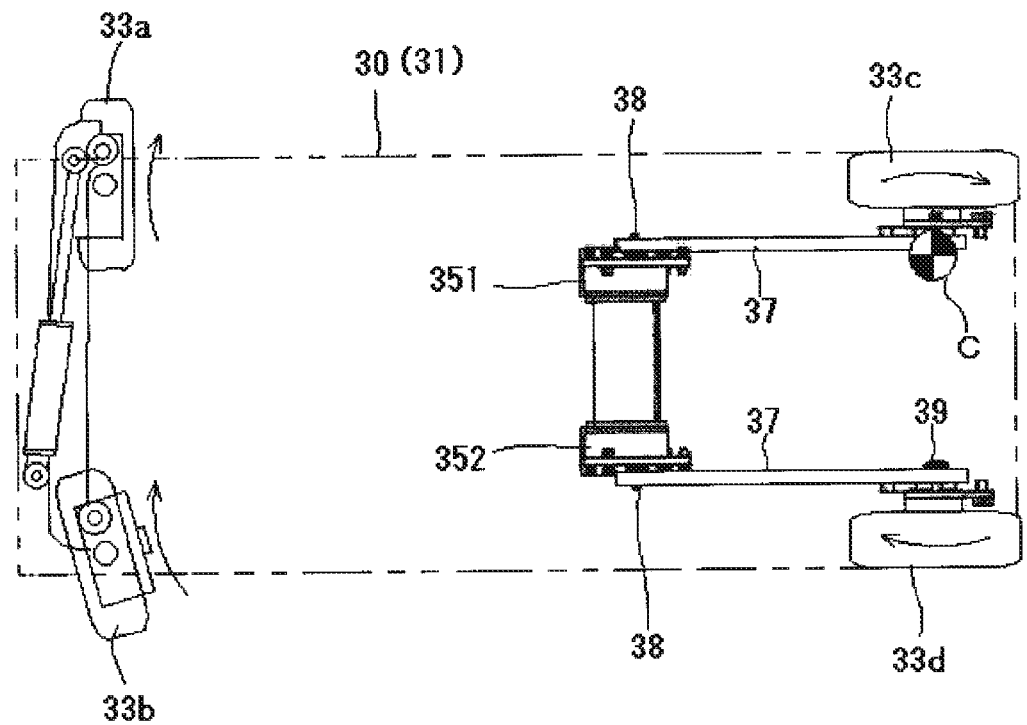
FIG. 2B is a plan view when turning right at maximum rudder angle.

The above vehicle body 31 provided to a lower portion of the frame 32 is formed with a rectangular shape having a length direction along the left-right direction of the page in the plan view illustrated in FIG. 2. Wheels 33 (33a to 33d) are respectively attached to vehicle axels that respectively protrude out in a width direction at each length direction end of the vehicle body 31.

The wheels 33 are configured by a pair of driven wheels (rear wheels) 33c, 33d, and a pair of steered wheels (front wheels) 33a, 33b. The driven wheels 33c, 33d are driven by a drive unit 35, described later, equipped with drive motors 351, 352. The steered wheels 33a, 33b are steered by a steering mechanism 50, described later, equipped with a steering actuator 515. This configuration enables the mobile aerial work platform 2 (the vehicle chassis 30) to travel.

[Travel Control Device]

(1) Overall Configuration of Travel Control Device

Figure 3:
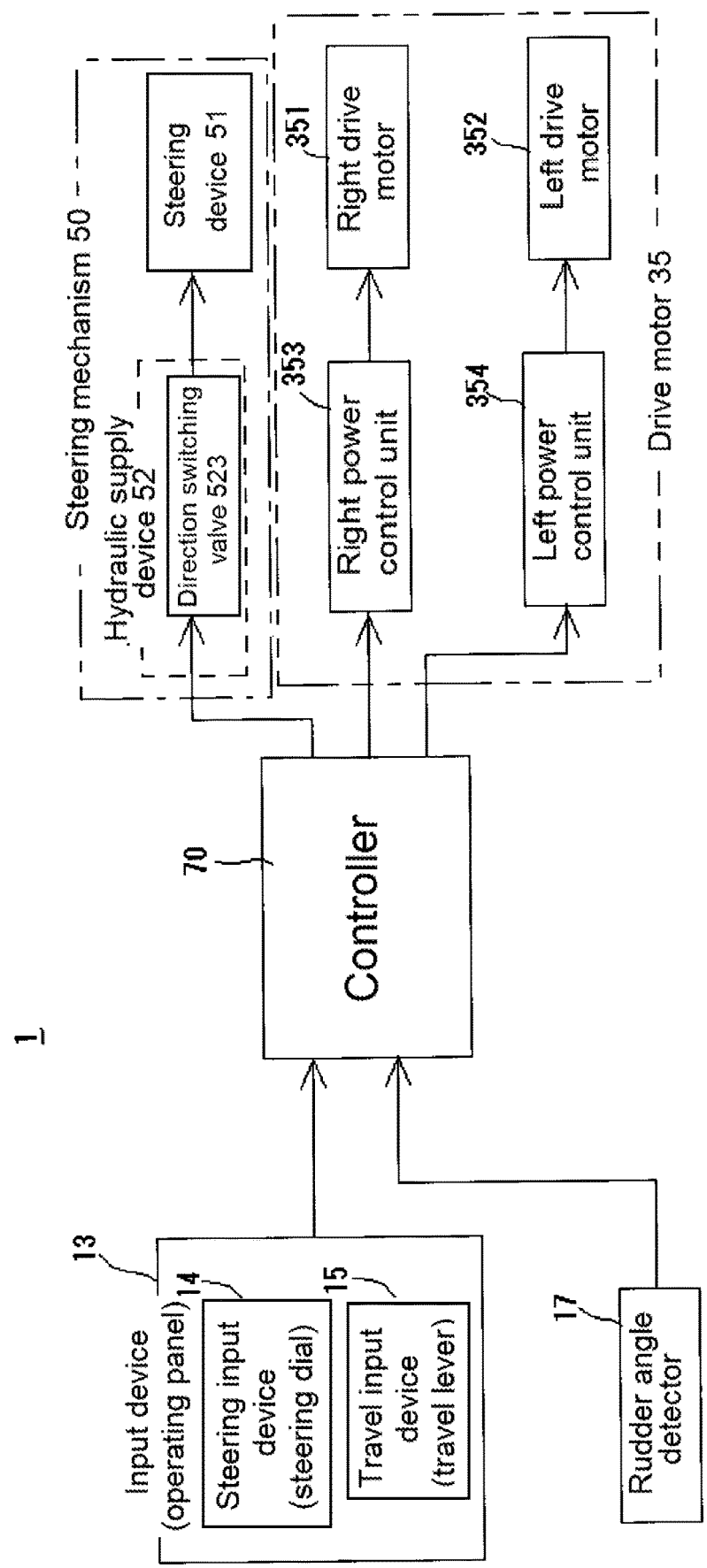
FIG. 3 is a block diagram illustrating a travel control device of the present invention.

In order to be able to cause the vehicle chassis 30 to travel by operation of an operator, the travel control device 1 of the present invention is, as illustrated in FIG. 3, configured including the steering mechanism 50 to steer the steered wheels, the drive unit 35 to drive the driven wheels, an input device 13 for the operator to input action instructions, a rudder angle detector 17 to detect a rudder angle of the steered wheels, and a controller 70 to control actions of the steering mechanism 50 and the drive unit 35 described above based on action instructions input by the input device 13 and on a rudder angle detected by the rudder angle detector 17.

(2) Steering Mechanism

The steering mechanism 50 for steering the steered wheels 33a, 33b is, in the present exemplary embodiment, configured by a steering device 51 to steer the steered wheels 33a, 33b, and by a hydraulic supply device 52 to supply hydraulic (fluid) to the steering device 51.

Figure 4:
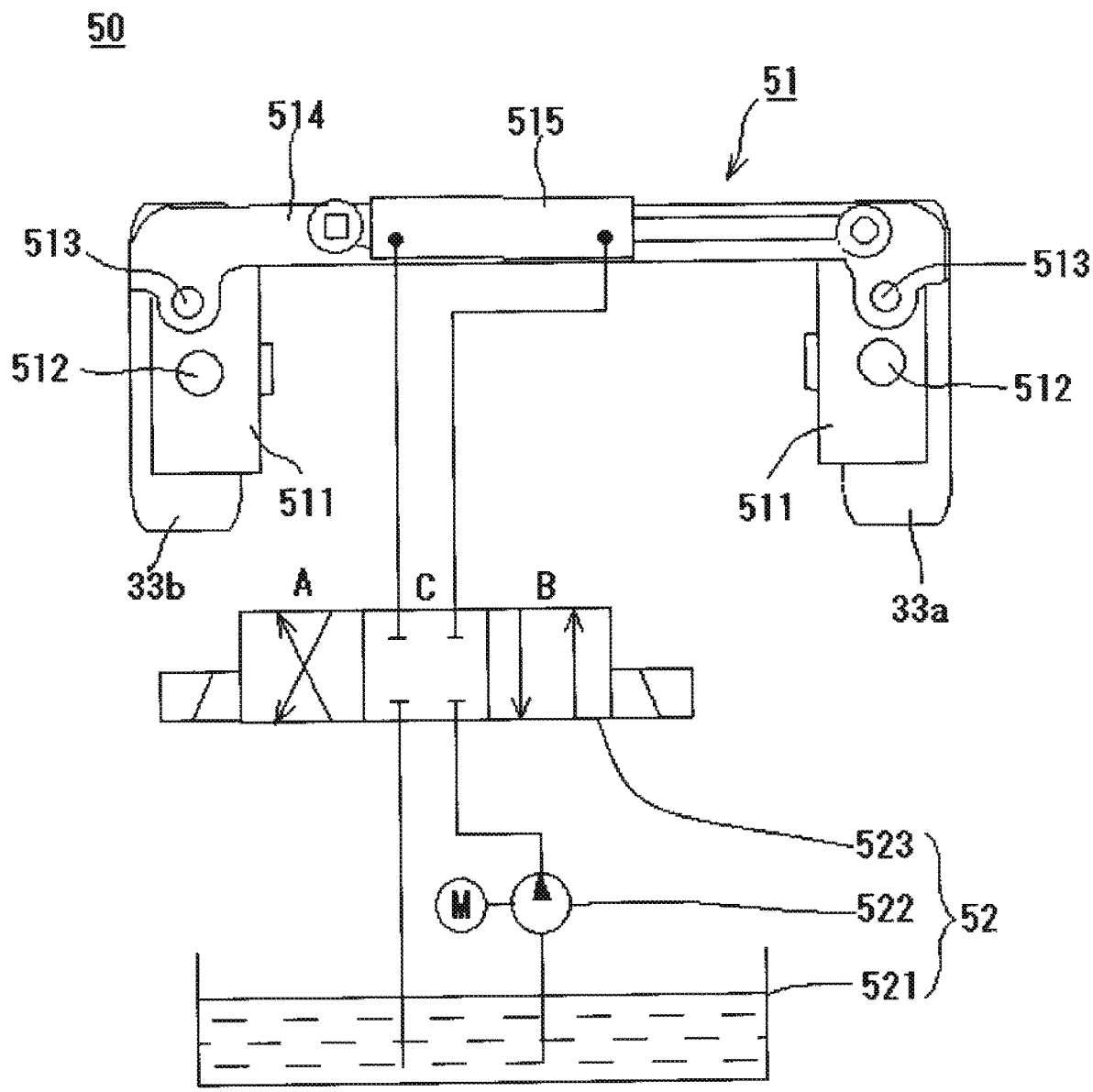
FIG. 4 is an explanatory diagram of a steering mechanism.

The steering device 51 is configured, as in the example illustrated in FIG. 4, with knuckles 511, 511 for attaching steered wheels 33a, 33b to, with kingpins 512, 512 to axially support the knuckles 511, 511 on the vehicle chassis 30 so as to be capable of swinging, with a tie-rod 514 coupling the left and right knuckles 511, 511 together through coupling pins 513, 513, and with a steering actuator to cause the knuckles 511, 511 to swing about pivot points at the kingpins 512, 512.

The illustrated exemplary embodiment has a configuration (so called "Ackerman mechanism") in which a spacing between the coupling pins 513, 513 for coupling to the tie-rod 514 is formed so as to be slightly longer than a spacing between the left and right kingpins 512, 512. This means that during turning the rudder angle of a wheel steered at outside to a turn direction (the steered wheel 33b in the example of FIG. 2B) is smaller than a rudder angle of the turn direction inside steered wheel (the steered wheel 33a in the example of FIG. 2B).

In the exemplary embodiment illustrated in FIG. 4, the hydraulic cylinder 515 is employed as the above steering actuator, with the leading end of a piston rod of the hydraulic cylinder 515 coupled to the tie-rod 514 and the opposite side of the hydraulic cylinder 515 to the piston rod fixed to the vehicle body 31 of the vehicle chassis 30 so as to be capable of swinging. A configuration is accordingly achieved in which the steered wheels 33a, 33b can be steered in the desired direction by introducing operating fluid into the hydraulic cylinder 515 or discharging operating fluid therefrom so as to cause the piston rod to extend or retract.

In the illustrated exemplary embodiment, the steered wheels 33a, 33b are configured so as to be steered in a clockwise direction (right turn) in plan view by extension of the hydraulic cylinder 515, and so as to be steered in counterclockwise direction (left turn) in plan view by contraction of the hydraulic cylinder 515.

In the present exemplary embodiment employing the hydraulic cylinder 515 as the steering actuator, the hydraulic supply device 52 is provided to control of introduction into or discharge operating fluid from the hydraulic cylinder 515.

The hydraulic supply device 52 is configured with an oil tank 521 for storing the operating fluid, an electric powered hydraulic pump 522, and a solenoid direction switching valve 523 to switch a hydraulic circuit between the electric hydraulic pump 522 and the hydraulic cylinder 515. The hydraulic cylinder 515 is extended by the direction switching valve 523 being switched to a position A, steering the steered wheels 33a, 33b in a clockwise direction (right turn direction). The hydraulic cylinder 515 is contracted by switching the direction switching valve 523 to a position B, steering the steered wheels 33a, 33b in a counterclockwise direction (left turn direction). Oil supply into the hydraulic cylinder 515 and oil discharge from the hydraulic cylinder 515 are both stopped by switching the direction switching valve 523 to a position C, enabling the hydraulic cylinder 515 to be fixed at a predetermined extension-contraction position.

Note that the configuration illustrated in FIG. 2 and FIG. 4 is a configuration in which the hydraulic cylinder 515 is provided as a steering actuator, however the steering actuator may be configured, for example, by a steering actuator equipped with a rack gear provided to the tie-rod 514 for coupling between the knuckles 511, 511, and by an electric motor equipped with a pinion gear provided so as to mesh with the rack gear. In this configuration of steering actuator, the above described hydraulic supply device 52 may be omitted, and the electric motor may be controlled directly, by using a control signal from the controller 70, described later, or the like.

(3) Drive Unit

The drive unit 35 to drive the driven wheels 33c, 33d is equipped with drive motors (a right drive motor 351 and a left drive motor 352) to respectively drive the driven wheels 33c, 33d, in a configuration in which the driven wheels 33c, 33d can each be rotated with an independent rotation direction and rotation speed by the drive motors 351, 352.

The exemplary embodiment illustrated in FIG. 2 has a configuration in which rotation of each of the drive motors 351, 352 is transmitted to the respective driven wheel 33c, 33d through a kinetic force transmission mechanism (chains 37 and sprockets 38, 39 in the illustrated example). However, the drive motors 351, 352 may be directly attached as in-wheel motors inside the wheels of the driven wheels 33c, 33d.

Moreover, a power control unit (a right power control unit 353, a left power control unit 354) is also provided to the drive unit 35 (see FIG. 3) to control power respectively supplied to the drive motors 351, 352 from a battery (not illustrated in the drawings) installed to the vehicle chassis.

The power control unit (the right power control unit 353, the left power control unit 354) converts power from the battery into power capable of driving the drive motors 351, 352 at a target rotation speed corresponding to the target rotation speeds received from the controller 70, described later, and outputs the converted power. As an example, a configuration is adopted that includes a power control unit equipped with a chopper circuit to convert the voltage of a battery to output voltages to rotate the drive motors 351, 352 at target rotation speeds corresponding to the target rotation speeds received from the controller 70, described later, or that includes an inverter or the like to convert direct current from the battery into an output alternating current enabling the drive motors to be rotated at the target rotation speeds received from the controller 70, described later.

Although electrical motors are employed for the drive motors 351, 352 in the present exemplary embodiment, the drive motors 351, 352 are not limited to being electric motors, as long as the rotation direction and rotation speed of the driven wheels 33c, 33d can each be controlled independently. A hydraulic motor may be employed therefor, and in such cases, instead of with the above power control units 353, 354, the drive unit 35 is provided with a configuration to control operating fluid introduction to the drive motors 351, 352.

(4) Input Device (Operating Panel)

In order to enable an operator being carried on the deck 10 of the mobile aerial work platform 2 to drive the mobile aerial work platform 2, the operating panel 13 is attached as an input device to the guard fence 11 at one end of the deck 10 (see FIG. 1).

Figure 5:
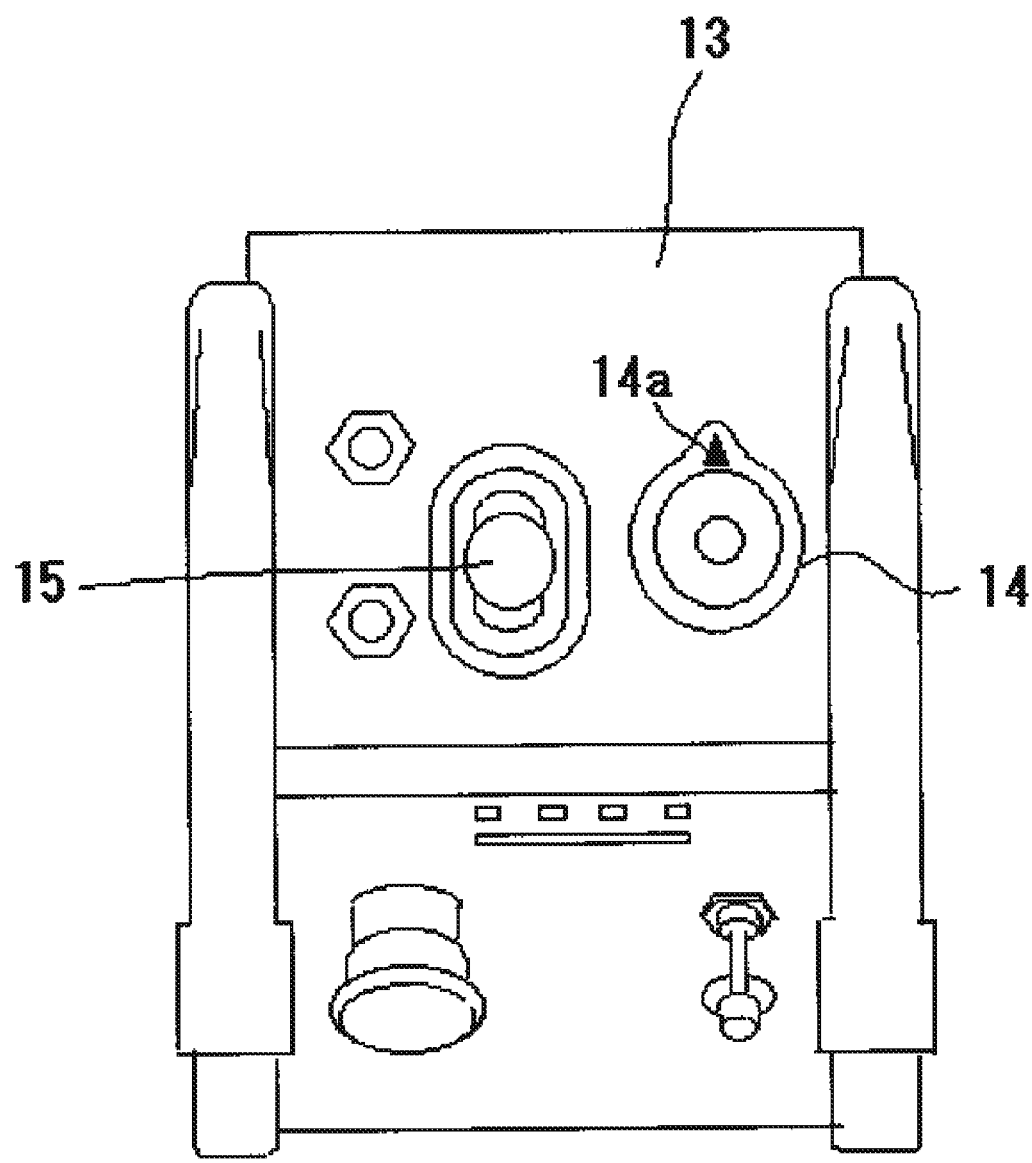
FIG. 5 is a plan view of an operating panel.

The operating panel 13 is, for example as illustrated in FIG. 5, provided with a steering input device (a steering dial in the illustrated example) 14 to input a steering direction in which to face the steered wheels 33a, 33b, and with a travel input device (travel lever in the illustrated example) 15 to input forward, reverse, stop, and travel speed of the vehicle chassis 30. In this configuration, forward, reverse, stop, and travel speed control of the mobile aerial work platform 2, as well as steering, can be performed by operating the steering input device (steering dial) 14 and the travel input device (travel lever) 15 provided to the operating panel 13.

The steering input device in the illustrated exemplary embodiment is the steering dial 14 including a potentiometer. Operating the steering dial 14 causes the potentiometer of the steering dial 14 to output an electrical signal in accordance with rotation angle to the controller 70, described later. The controller 70 is configured to control the steering mechanism 50 according to the rotation angle input by the steering dial 14 in this manner, so as to enable the steered wheels 33a, 33b to be steered so as to face in the required steering directions.

Note there the rotation angle of the steering dial 14 does not necessarily always match the rudder angle of the steered wheels 33a, 33b. However, in the present exemplary embodiment, in order to facilitate driving by imparting an operator with the sensation that the rotation angle of the steering dial 14 matches the turn direction of the vehicle chassis, a configuration is adopted in which the steering dial can be rotated over a total range of 180°, i.e. by 90° clockwise and by 90° counterclockwise from a neutral position illustrated in FIG. 5 (a position in which a marker 14a is positioned at 0°, i.e. facing toward the top of the page). In this configuration the rudder angle of the steered wheels 33a, 33b can be steered so as to correspond to changes in rotation angle of the steering dial 14, and more specifically when turning right a rudder angle of the right steered wheel 33a on the turn direction inside can be steered over a 90° range clockwise from a straight ahead position (0°), and when turning left a rudder angle of the left steered wheel 33b on the turn direction inside can be steered over a 90° range counterclockwise from the straight ahead position (0°).

Moreover, a travel lever 15 including a potentiometer is provided to the operating panel 13 as the above travel input device. An electrical signal is output to the controller 70 according to the operating position of the travel lever 15, in a configuration in which the mobile aerial work platform 2 is stopped by the travel lever 15 being in a neutral position, can be moved forward by tilting the travel lever 15 forward, can be moved backward by tilting the travel lever 15 back, and in which the travel speed of the mobile aerial work platform 2 can be adjusted by changing the tilt angle of the travel lever 15.

Note that although explanation has been given in the present exemplary embodiment of a case in which the steering dial 14 is provided as the steering input device, a lever type of steering input device may be provided instead of such a configuration. Moreover, although explanation has been given in the present exemplary embodiment of a configuration in which the travel lever 15 is provided as the travel input device, a dial type of travel input device may be provided instead of such a configuration. These configurations may also each be changed to one of various known input devices.

Moreover, although a configuration has been explained for the present exemplary embodiment in which the steering input device 14 and the travel input device 15 are each provided separately, the steering input device 14 and the travel input device 15 may be implemented by a single input device, such as, for example, a joystick capable of being tilted to the front-rear and to the left-right.

(5) Rudder Angle Detector

In order to control the steered wheels 33a, 33b accurately according to input of the steering dial 14, in the present exemplary embodiment a rudder angle detector 17 is provided to detect the rudder angles of the steered wheels 33a, 33b. The rudder angle of the steered wheels 33a, 33b as detected by the rudder angle detector 17 is then input to the controller 70, described later (see FIG. 3).

The rudder angle detector 17 may be configured so as to detect the rudder angle of the left and right steered wheels 33a, 33b using a common rudder angle detector 17, such as a rudder angle detector using a detector to detect a rotation angle of either the left or right kingpin 512, or coupled to the tie-rod 514 through a link so as to detect rudder angle from swing of the tie-rod 514. Alternatively, a rudder angle detector to detect the rudder angle of the right steered wheel 33a, and a rudder angle detector to detect the rudder angle of the left steered wheel 33b, may be provided separately to each other.

(6) Controller

The controller 70 described above is an electronic control unit to control actions of the direction switching valve 523 provided to the hydraulic supply device 52 of the steering mechanism 50 and actions of the power control unit (the right power control unit 353, the left power control unit 354) provided to the drive unit 35 according to input from the steering input device (steering dial) 14 and the travel input device (travel lever) 15 provided to the operating panel 13 serving as an input device as illustrated in FIG. 3, and according to input from the rudder angle detector 17.

The controller 70 takes a target rudder angle set based on a rotation angle of the steering dial 14 from the neutral position, and compares this against a detected rudder angle as detected by the rudder angle detector 17. The controller 70 then performs steering control by controlling the direction switching valve 523 so as to operate the hydraulic cylinder 515 of the steering mechanism 50 in a direction to make a difference between the target rudder angle and the detected rudder angle decrease to zero.

As described above, in the present exemplary embodiment the rudder angle of the wheel steered at outside to the turn direction is smaller than the attack angle of the turn direction inside steered wheel due to the steering dial 14 being rotatable over a total range of 180°, i.e. 90° clockwise from the neutral position and 90° counterclockwise therefrom, and due to adopting the Ackermann mechanism for the steering device 51. The range of rudder angle of the wheel steered at outside to the turn direction does not match the range of rotation angle of the steering dial 14, and so control is preferably performed to match the rudder angle of the turn direction inside steered wheel to the rotation angle of the steering dial 14.

As an example, in a configuration in which a rudder angle detector to detect the rudder angle of the right steered wheel 33a and a rudder angle detector to detect the rudder angle of the left steered wheel 33b are separately provided, the controller 70 controls the steering mechanism 50 based on the rudder angle of the right steered wheel 33a, i.e. the turn direction inside steered wheel when the vehicle chassis 30 is turning right, and controls the steering mechanism 50 based on the rudder angle of the left steered wheel 33b, i.e. the turn direction inside steered wheel when the vehicle chassis 30 is turning left.

Moreover, as an example of a configuration in which a single rudder angle detector 17 is provided to detect the rudder angle of either the left or right steered wheel 33a, 33b, rudder angle differences between the wheel steered at outside to the turn direction with respect to the turn direction inside steered wheel are pre-stored in the controller 70. The target rudder angle or the detected rudder angle is then corrected based on these rudder angle differences, and control is performed so that the rotation angle of the steering dial 14 matches the rudder angle of the turn direction inside steered wheel.

As an example, in a configuration provided with a sole rudder angle detector 17 to detect the rotation angle of the kingpin 512 that axially supports the right steered wheel 33a, suppose the rudder angle of the right steered wheel 33a changes clockwise from 0° to 90° from a central straight ahead position but changes counterclockwise from 0° to −75° from the central straight ahead position. When the steering dial 14 has been rotated clockwise from the neutral position, the controller 70 sets a target rudder angle as the unaltered rotation angle of the steering dial 14 from the neutral position, and compares the detected rudder angle with respect to the straight ahead position unaltered against the target rudder angle. However, when the steering dial 14 has been rotated counterclockwise from the neutral position, the controller 70 sets, as the target rudder angle, an angle that is a multiple of 75/90 times the rotation angle of the steering dial 14 from the neutral position, or performs steering control using, as the detected rudder angle of the left steered wheel 33b, a value arrived at by multiplying a detected rudder angle of the right steered wheel 33a with respect to the straight ahead position as detected by the rudder angle detector 17 by a multiple of 90/75.

Moreover, the controller 70 sets the target rotation speed of drive motors 351, 352 on the right and left sides according to input performed through the travel lever 15 and the steering dial 14, and outputs the set target rotation speeds to the power control unit (the right power control unit 353 and the left power control unit 354). The power control unit (the right power control unit 353 and the left power control unit 354) then converts the power of a non-illustrated battery into the power needed to generate these target rotation speeds and outputs the converted power to each of the driven wheels 33c, 33d, so as to perform drive control to rotate each of the driven wheels 33c, 33d at the respective target rotation speeds.

Operation etc.

(1) Steering Control

In the mobile aerial work platform 2 equipped with the travel control device 1 as described above, the steering control performed by operating the steering input device (steering dial) 14 is performed, for example, in the following manner (see FIG. 6).

When an operator being carried on the deck 10 operates the steering dial 14 provided to the operating panel 13, by rotating the steering dial 14 clockwise or by rotating the steering dial 14 counterclockwise with respect to the neutral position, a steering direction in which to face the steered wheels 33a, 33b, this being a rudder angle with respect to the straight ahead position of the steered wheels in the present example, is input by the rotation angle of the steering dial 14 with respect to the neutral position. Due to such operation of the steering dial 14, the controller 70 receives the rotation angle input using the steering dial 14 from the potentiometer provided to the steering dial 14 (step A1 in FIG. 6).

Figure 6:
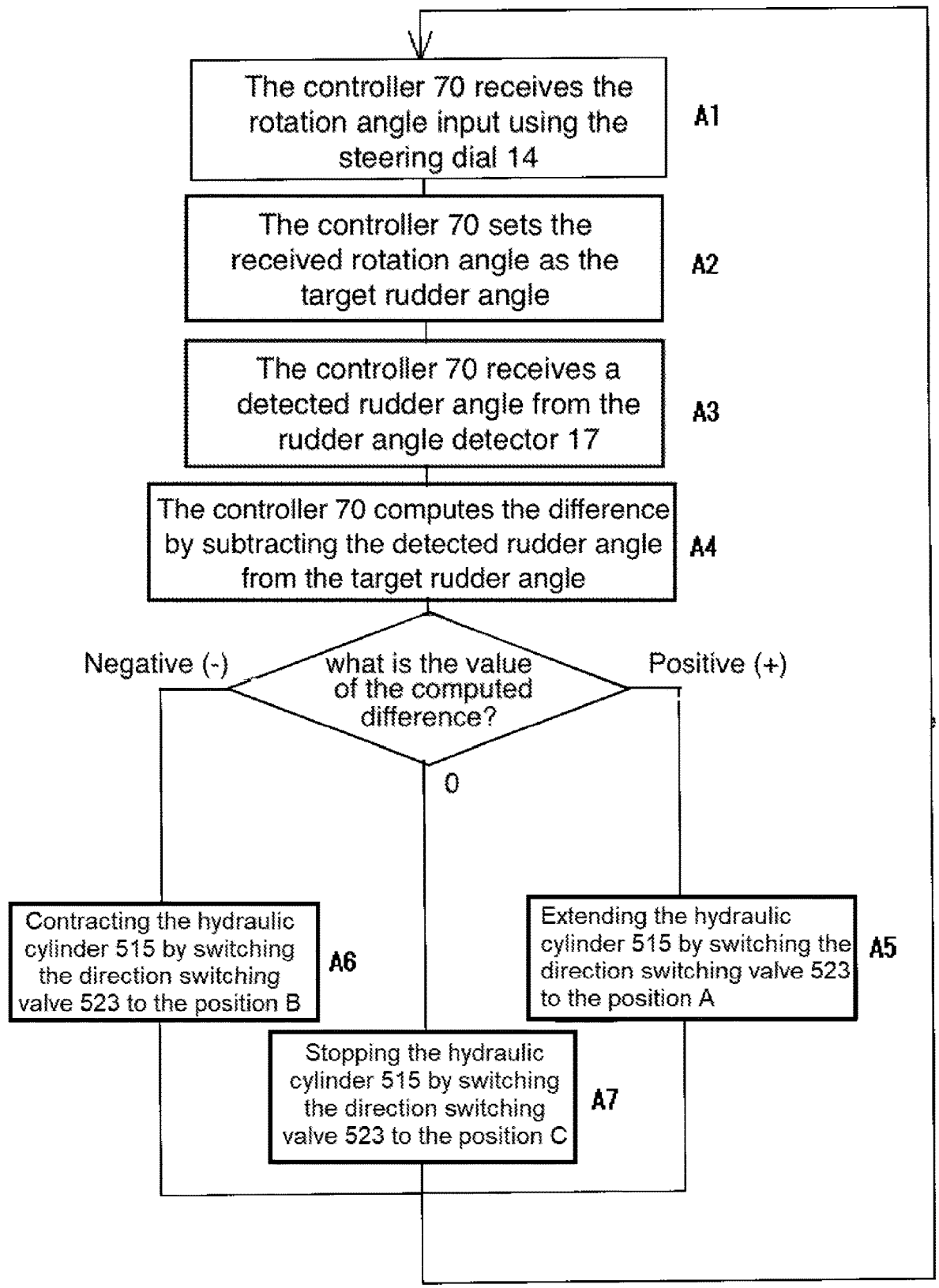
FIG. 6 is a flowchart of steering control based on a rotation angle of a steering dial.

The controller 70 that has received the rotation angle of the steering dial 14 sets the rotation angle received from the steering dial 14 as the "target rudder angle" (step A2 of FIG. 6).

The controller 70 then receives, as the "detected rudder angle" a detection signal of the rudder angle detector 17 for detecting the rudder angle of the steered wheels 33a, 33b (step A3 of FIG. 6).

In the present exemplary embodiment, the controller 70 sets the target rudder angle to "0" when the steering dial 14 is at the neutral position, sets the target rudder angle to a positive (+) value when the steering dial 14 has been operated by clockwise direction rotation, and sets the target rudder angle to a negative (−) value when operated by counterclockwise direction rotation.

Based on the detection signal of the rudder angle detector 17, the controller 70 acquires a rudder angle "0" when the steered wheels are in the straight ahead position in plan view, acquires a positive (+) value detected rudder angle when they are steered in a clockwise direction with respect to the straight ahead position, and acquires a negative (−) value detected rudder angle when they are steered in the counterclockwise direction.

Then based on the target rudder angle and the detected rudder angle, the controller 70 performs proportional control so as to switch the direction switching valve 523 provided to the steering mechanism 50 and to operate the hydraulic cylinder 515 so as to make the detected rudder angle match the target rudder angle (so as to make the difference therebetween zero).

In order to perform such proportional control, the controller 70 finds the "difference" by subtracting the detected rudder angle based on the detection signal of the rudder angle detector 17 from the target rudder angle set based on the rotation angle of the steering dial 14 (step A4 of FIG. 6).

When the value of the difference is found to be a positive (+) value, the controller 70 outputs an operation signal to switch the direction switching valve 523 to position A of FIG. 4, extending the hydraulic cylinder 515 (step A5 of FIG. 6). When the difference is found to be a negative (−) value, the controller 70 outputs an operation signal to switch the direction switching valve 523 to the position B of FIG. 4, contracting the hydraulic cylinder 515 (step A6 of FIG. 6).

The controller 70 continuously monitors the detection signal of the rudder angle detector 17, and when the difference between the detected rudder angle and the target rudder angle is "0", the controller 70 outputs an operation signal to switch the direction switching valve 523 to position C in FIG. 4, interrupting supply of operating fluid to the hydraulic cylinder 515 and recovery of operating fluid therefrom, and stopping the hydraulic cylinder 515 from moving (step A7 of FIG. 6).

Thereby, a control is performed to make the detected rudder angle of the steered wheels 33a, 33b as detected by the rudder angle detector 17 match the target rudder angle input by operation of the steering dial 14 (so that the difference becomes zero).

As an example, operation is performed when the steering dial 14 is rotated in a clockwise direction, from a state in which the steering dial 14 is at the neutral position and the steered wheels 33a, 33b are at the straight ahead position, will now be explained, with reference to FIG. 7.

When the controller 70 has received the rotation angle input by such operation of the steering dial 14 (step B1 of FIG. 7), the controller 70 sets a positive (+) target rudder angle corresponding to the rotation angle of the steering dial 14 (step B2 of FIG. 7), acquires "0" as a rudder angle of the steered wheels in the straight ahead position based on the detection signal detected by the rudder angle detector 17 (step B3 of FIG. 7), and computes a positive (+) value difference by subtracting the rudder angle "0" from the positive (+) target rudder angle (step B4 of FIG. 7).

The controller 70 then outputs an operation signal to switch the direction switching valve 523 to the position A of FIG. 4 and to extend the hydraulic cylinder 515 (step B5 of FIG. 7) so as to correspond to the positive (+) value difference.

The hydraulic cylinder 515 is extended by such switching of the direction switching valve 523, turning the steered wheels 33a, 33b in a clockwise direction in plan view. The detected rudder angle received by the controller 70 from the rudder angle detector 17 accordingly becomes a positive (+) and increasing absolute value, the difference between the target rudder angle and the detected rudder angle accordingly gradually decreases, until reaching "0" in due course.

When the difference has reached "0" in this manner, the controller 70 outputs an operation signal to switch the direction switching valve 523 to the position C of FIG. 4 in order to stop the hydraulic cylinder 515. The flow of operating fluid between the hydraulic supply device 52 and the hydraulic cylinder 515 is thereby interrupted, stopping the hydraulic cylinder 515 (step B6 of FIG. 7).

When the detected rudder angle becomes greater than the target rudder angle due to delayed operation of the direction switching valve 523 or the like then the difference will become a negative (−) value. The controller 70 accordingly outputs an operation signal to switch the direction switching valve 523 to position B of FIG. 4, generating a flow of operating fluid to contract the hydraulic cylinder 515 (step B7 of FIG. 7).

Then when the difference becomes "0", an operation signal is output to switch the direction switching valve 523 to position C to interrupt the flow of operating fluid between the hydraulic supply device 52 and the hydraulic cylinder 515 and stop supplying the hydraulic fluid. While the rotation angle of the steering dial 14 is fixed by the operator, the rudder angle of the steered wheels 33a, 33b is fixed so as to correspond to this rotation angle (step B6 of FIG. 7).

When, for example, the operator returns the steering dial 14 to the neutral position from a stopped state of the hydraulic cylinder 515, the controller 70 computes a negative (−) difference by subtracting the positive (+) detected rudder angle from the target rudder angle "0" which corresponds to the state in which the steering dial 14 is at the neutral position (step B8 of FIG. 7). Then based on this computation result, the controller 70 outputs an operation signal to switch the direction switching valve 523 to the position B of FIG. 4, contracting the hydraulic cylinder 515 (step B9 of FIG. 7).

The difference between the target rudder angle and the detected rudder angle gradually diminishes due to the steered wheels 33a, 33b being steered in the counterclockwise direction, thereby, the difference becomes "0" when the hydraulic cylinder 515 has contracted to the extent that the steered wheels 33a, 33b reach the neutral position. The controller 70 outputs an operation signal to switch the direction switching valve 523 to the position interrupting the flow of operating fluid between the hydraulic supply device 52 and the hydraulic cylinder 515, fixing the steered wheels 33a, 33b at the neutral position (step B6 of FIG. 7).

A configuration such that the steered wheels 33a, 33b are steered according to operation of the steering dial 14 by the operator is achieved in this manner by the controller 70 outputting operation signals to the direction switching valve 523 so as to make the difference between the target rudder angle and the detected rudder angle zero.

(2) Drive Control

In the mobile aerial work platform 2 equipped with the above travel control device 1, rotation speed control of the drive motors 351, 352 is performed according to input by the travel input device (travel lever 15) and to a rudder angle θ of the steered wheels 33a, 33b, as the following manner, for example.

Note that in order to control the drive motors 351, 352 using operation of the travel lever 15, the controller 70 is pre-stored with a "basic rotation speed" that is common to the left and right drive motors 351, 352 and that changes so as to correspond to changes in the operation position of the travel lever 15.

In the present exemplary embodiment, the "basic rotation speed" is set with a basic rotation speed of "0" to indicate "stop" for the travel lever 15 in the neutral position, with a positive (+) basic rotation speed representing "forward" for a state in which the travel lever 15 is tilted forward with respect to the neutral position, with a negative (−) basic rotation speed representing "backward" for a state in which the travel lever 15 is tilted backward with respect to the neutral position, and with the absolute values of the basic rotation speed set so as to increase as the forward or backward tilt angle increases with respect to the neutral position.

Moreover, the controller 70 also stores, as correction coefficients, correspondence relationships for how to correct the rotation speeds of the right drive motor 351 and the left drive motor 352 relative to the above basic rotation speeds by using the detected rudder angle of the rudder angle detector 17.

In the present exemplary embodiment, the rudder angle (detected rudder angle) θ of the steered wheels 33a, 33b detected by the rudder angle detector 17 employed for steering control is also employed in drive control. As listed in Table 1 below, "speed reduction coefficients" are stored for computing the target rotation speed of each of the drive motors 351, 352 by reducing the speed of the "basic rotation speed" in accordance with the detected rudder angle.

Note that although the correction coefficients are stored in the present exemplary embodiment as "speed reduction coefficients", the correction coefficients may be stored as "speed increase coefficients" to increase the speed of the basic rotation speed in accordance with the detected rudder angle of the rudder angle detector 17.

Moreover, in the present exemplary embodiment described below, explanation is given regarding a configuration in which the controller 70 computes the target rotation speed based on the detected rudder angle detected by the rudder angle detector 17. However, in the present exemplary embodiment in which steering control is performed so as to make the rotation angle from the neutral position of the steering dial 14 match the rudder angle θ of the steered wheels 33a, 33b, instead of control based on the detected rudder angle of the rudder angle detector 17, the controller 70 may be configured so as to compute the target rotation speed based on the rotation angle of the steering dial 14.

In such cases, as correction coefficients, the controller 70 is stored with correspondence relationships of how to correct the respective rotation speeds of the right drive motor 351 and the left drive motor 352 with respect to the relevant basic rotation speed using changes to the rotation angle of the steering dial 14.

These correspondence relationships may also be stored as "speed reduction coefficients" for computing the target rotation speed of each of the drive motors 351, 352 by reducing the speed of the "basic rotation speed" in accordance with the rotation angle of the steering dial 14, or may be stored as "speed increase coefficients" to increase the speed of the basic rotation speed in accordance with the rotation angle of the steering dial.

TABLE 1

Speed Reduction Coefficients (Correction Coefficients)

| | Rudder Angle Detector | | Speed Reduction Coefficient | |
|---|---|---|---|---|
| | Steering Level | Detected Rudder Angle θ Range | Right Side | Left Side |
| Clockwise Rotation Right Turn | +7 | +78° < θ ≤ +90° | 0.6 | −0.6 |
| | +6 | +66° < θ ≤ +78° | 0.7 | −0.3 |
| | +5 | +54° < θ ≤ +66° | 0.8 | −0.2 |
| | +4 | +42° < θ ≤ +54° | 0.8 | 0.2 |
| | +3 | +30° < θ ≤ +42° | 0.9 | 0.3 |
| | +2 | +18° < θ ≤ +30° | 0.9 | 0.5 |
| | +1 | +6° < θ ≤ +18° | 1.0 | 0.7 |
| Neutral Position (Straight Ahead) | 0 | −6° ≤ θ ≤ +6° | 1.0 | 1.0 |
| Left Turn Counterclockwise Rotation | −1 | −18° ≤ θ < −6° | 0.7 | 1.0 |
| | −2 | −30° ≤ θ < −18° | 0.5 | 0.9 |
| | −3 | −42° ≤ θ < −30° | 0.3 | 0.9 |
| | −4 | −54° ≤ θ < −42° | 0.2 | 0.8 |
| | −5 | −66° ≤ θ < −54° | −0.2 | 0.8 |
| | −6 | −78° ≤ θ < −66° | −0.3 | 0.7 |
| | −7 | −90° ≤ θ < −78° | −0.6 | 0.6 |

Note that the present exemplary embodiment adopts a configuration in which an Ackermann mechanism is employed for the steering device 51, in a configuration in which, during a right turn the rudder angle of the right steered wheel 33a with respect to the straight ahead position changes over a range from 0° to 90° and the rudder angle of the left steered wheel changes over a range from 0° to 75°. However, during a left turn the rudder angle of the right steered wheel 33a changes over a range from 0° to −75° and the rudder angle of the left steered wheel changes over a range from 0° to −90°. In this configuration a sole rudder angle detector 17 is provided to detect the rotation angle of the kingpin 512 supporting the right steered wheel 33a.

Thus in the present exemplary embodiment, with respect to the detected rudder angle θ listed in Table 1, although when turning right the rudder angle of the right steered wheel 33a as detected by the rudder angle detector 17 is employed unaltered as the detected rudder angle (+θ), when turning left a rudder angle of the left steered wheel 33b is found by multiplying the rudder angle of the right steered wheel 33a as detected by the rudder angle detector 17 by a multiple of 90/75 to give the detected rudder angle (−θ).

An example will now be explained, with reference to FIG. 8, of processing that employs the basic rotation speeds and the speed reduction coefficients (correction coefficients) as described above to control the rotation speeds of the left and right driven wheels (drive motors) according to the tilt direction (forward tilt/backward tilt) and tilt angle of the travel lever, and according to the rudder angle θ of the steered wheels 33a, 33b (the detected rudder angle of the rudder angle detector 17 in the present exemplary embodiment).

Figure 8:
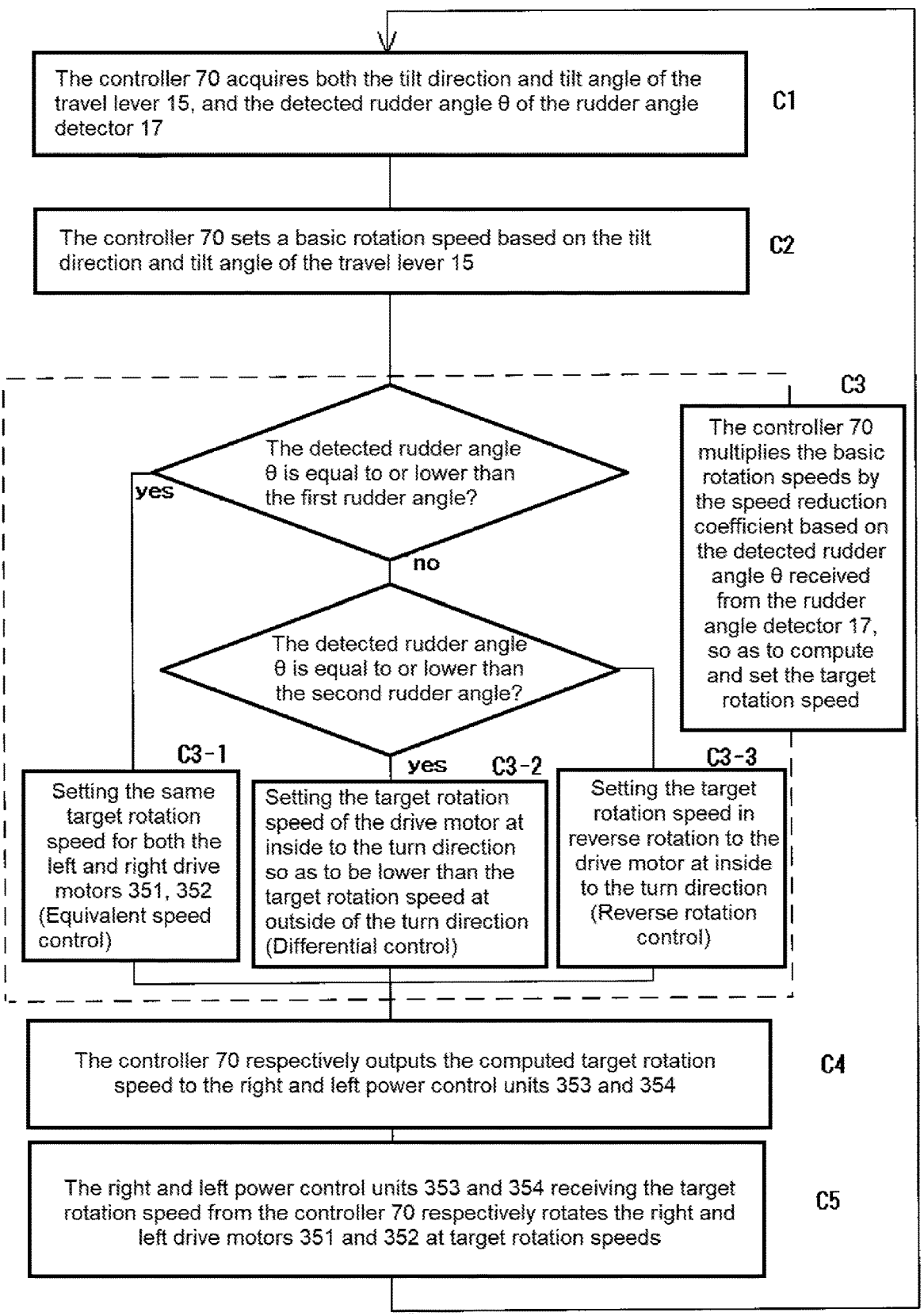
FIG. 8 is a flowchart illustrating drive control.

When an operator operates the travel lever 15 and the steering dial 14, the controller 70 acquires both the tilt direction and tilt angle of the travel lever 15, and the detected rudder angle of the rudder angle detector 17 (step C1 of FIG. 8).

Based on the pre-stored correspondence relationships, the controller 70 that has received the tilt direction and tilt angle of the travel lever 15 sets a basic rotation speed of "0" when the travel lever 15 is in the neutral position, and sets target rotation speeds that are positive (+) values when in a forward tilt position and that are negative (−) values when in a backward tilt position, with the absolute values set so as to correspond to the respective tilt angles (step C2 of FIG. 8).

Then the controller 70 multiplies each of the above basic rotation speeds by the respective speed reduction coefficient listed in Table 1 as identified based on the detected rudder angle received from the rudder angle detector 17, so as to respectively compute the target rotation speed to be generated by the right drive motor 351 and the target rotation speed to be generated by the left drive motor 352 (step C3 of FIG. 8).

Note that the target rotation speed of the right drive motor 351 therein is computed by multiplying the relevant basic rotation speed by the right side speed reduction coefficient listed in Table 1 as corresponding to the detected rudder angle of the rudder angle detector 17, and the target rotation speed of the left drive motor 352 therein is computed by multiplying the relevant basic rotation speed by the left side speed reduction coefficient listed in Table 1 as corresponding to the detected rudder angle of the rudder angle detector 17.

The target rotation speed of the right drive motor 351 computed by the controller 70 in this manner is then output to the right power control unit 353 to control power supply to the right drive motor 351, and the target rotation speed of the left drive motor 352 is output to the left power control unit 354 to control power supply to the left drive motor 352 (step C4 of FIG. 8).

The right power control unit 353 that has received the target rotation speed of the right drive motor 351 from the controller 70, outputs to the right drive motor 351 power that has been converted so as to correspond to the received target rotation speed, thereby rotating the right drive motor 351 at the target rotation speed; the left power control unit 354 that has received the target rotation speed of the left drive motor 352 from the controller 70, outputs to the left drive motor 352 power converted so as to correspond to the received target rotation speed, and the left drive motor 352 is thereby rotated at the target rotation speed (step C5 of FIG. 8). The speed reduction coefficients (the right side speed reduction coefficient and the left side speed reduction coefficient) are respectively set according to "steering levels" formed by dividing detected rudder angles of the rudder angle detector 17 into predetermined ranges, as illustrated in Table 1. Then, a control is performed in the following manner in accordance with each of the steering levels that the detected rudder angle of the rudder angle detector 17 actually falls in.

Note that the following description is a description of an example of a case in which the steering dial 14 is operated in the clockwise direction, and description of a case in which operation is made in the counterclockwise direction will be omitted since this is merely left-right reversed.

In the present exemplary embodiment the steering levels are divided into a total of 15 steps, from −7 to +7, each of 12°, and in total covering a range of 180° (a range of from −90° to) +90° of a detected rudder angle (from 0° to +90°) for the right steered wheel 33a and a detected rudder angle (from 0° to)−90° for the left steered wheel 33b. The speed reduction coefficients are determined for each of these steering levels (see Table 1).

When the detected rudder angle θ of the rudder angle detector 17 is in the steering level "0" range, namely, a range less than or equal to a first rudder angle (±6°), then the speed reduction coefficient is 1.0 for both the right side and the left side (see Table 1). The controller 70 accordingly employs the unmodified basic rotation speed as the target rotation speed for both the right power control unit 353 and the left power control unit 354, namely, sets the same target rotation speed for both the left and right drive motors (step C3-1 of FIG. 8).

Thus the right power control unit 353 and the left power control unit 354 that have received this target rotation speed, perform equivalent speed control to cause the right drive motor 351 and the left drive motor 352 to both rotate at in the same rotation direction and at the same rotation speed.

Moreover, in cases in which the detected rudder angle θ of the rudder angle detector 17 is in a range that exceeds the steering level 0 but is less than or equal to one of the steering levels from +1 to +4)(+54°, namely, falls in a range exceeding the first rudder angle (±6°) but less than or equal to a second rudder angle (±54°), then the speed reduction coefficient on the right side, i.e. at the turn direction inside, is less than the speed reduction coefficient on the left side, i.e. at the turn direction outside. However, in the range less than or equal to the second rudder angle, the left and right speed reduction coefficients both maintain positive (+) values.

Thus, in a range exceeding the first rudder angle but less than or equal to the second rudder angle, the controller 70 sets a lower speed for a target rotation speed to output to the right power control unit 353 than a target rotation speed to output to the left power control unit 354 (step C3-2 of FIG. 8). Although the left power control unit 354 and the right power control unit 353 accordingly rotate both the left drive motor 352 and the right drive motor 351 in the same rotation direction, differential control is performed so that the rotation speed of the right drive motor 351 is a lower speed than that of the left drive motor 352, enabling smooth turning to be performed by the mobile aerial work platform.

In particular, in the present exemplary embodiment, as the detected rudder angle θ of the rudder angle detector 17 gets larger and the steering level increases from +1 to +4, the rotation speed of the driven wheels 33c, 33d is reduced in speed at both the turn direction outside and inside. Lowering the travel speed in this manner suppresses an increase in lateral acceleration accompanying a reduction in turning radius, which in turn makes sideways swaying of the mobile aerial work platform less liable to occur during turning.

Figure 12:
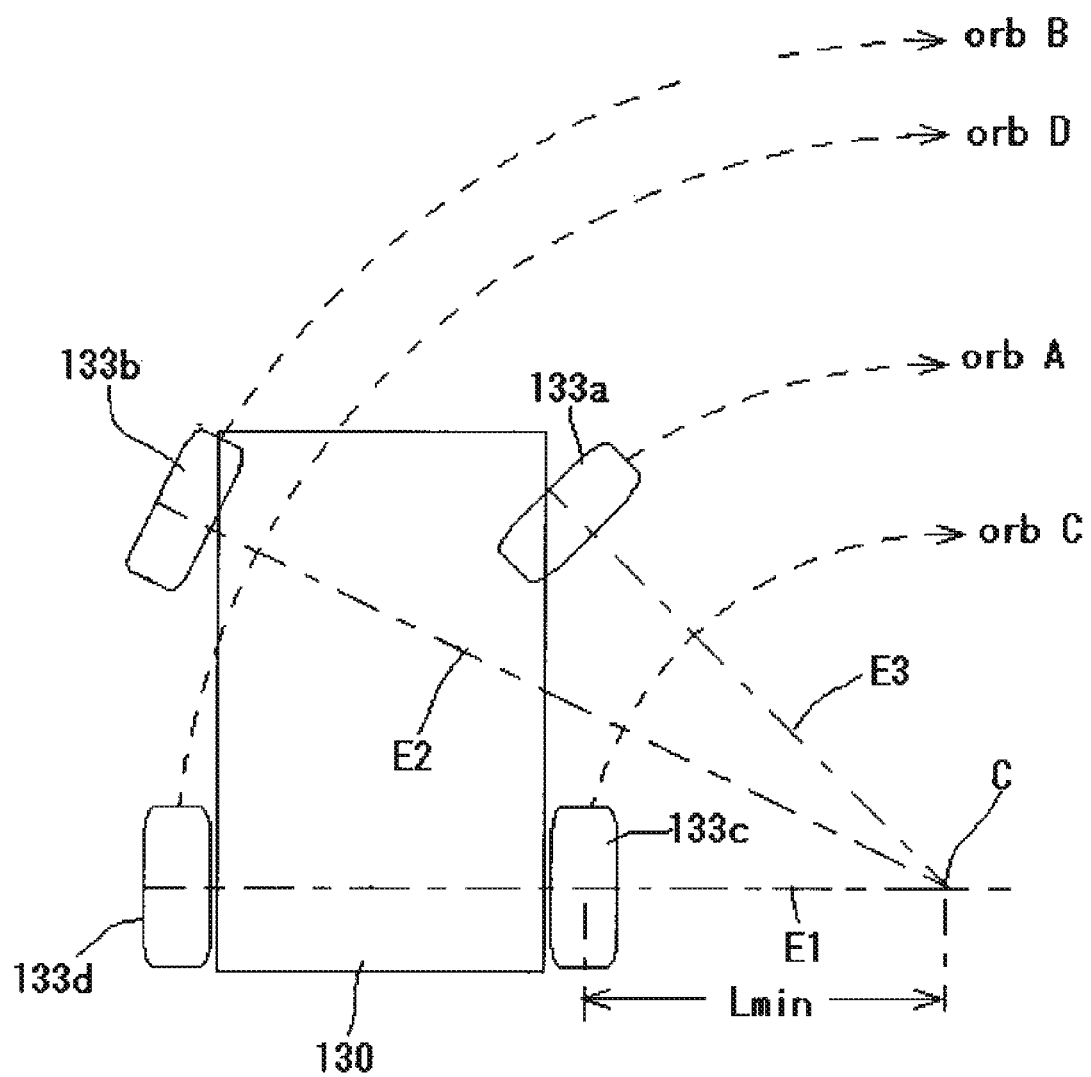
FIG. 12 is an explanatory diagram to explain a turning center of a vehicle chassis (Related Art).
Figure 13:
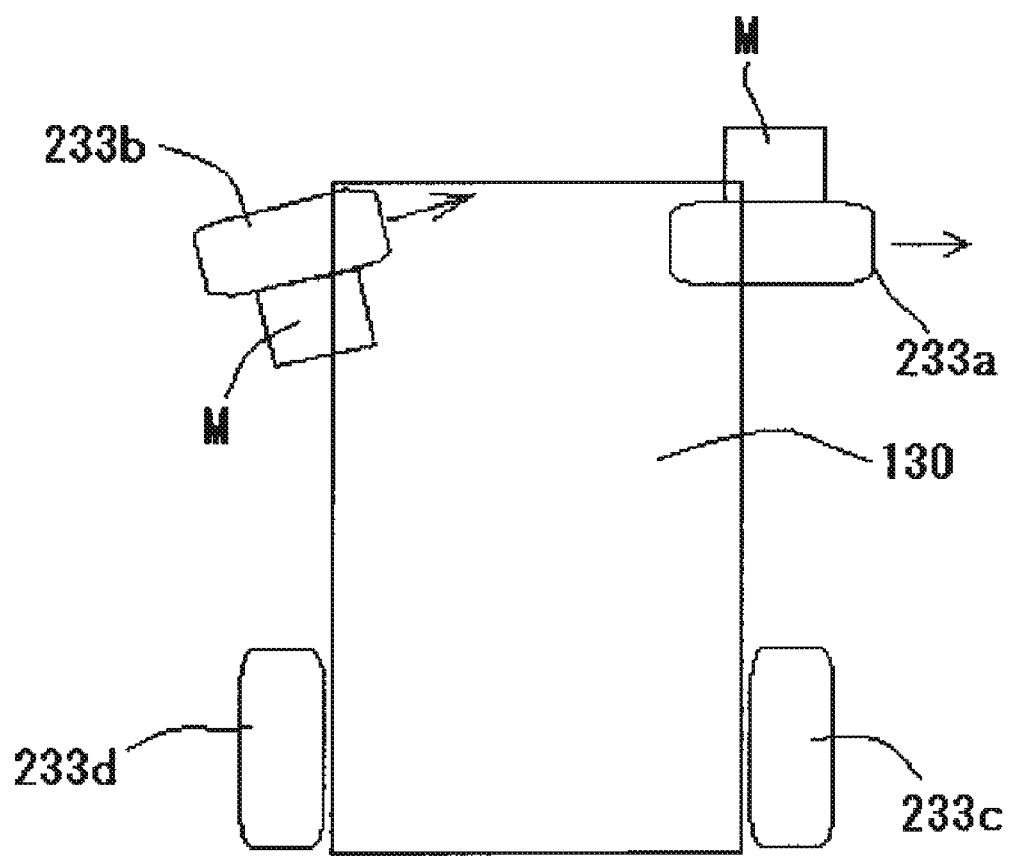
FIG. 13 is an explanatory diagram to explain anticipated issues for a case in which in-wheel motors are provided to steered wheels.

Moreover, as the turning center C illustrated in FIG. 12 gradually approaches the wheel driven at inside to the turn direction (133c) as the rudder angle of the steered wheels 33a, 33b gets larger, the circumferential length of the inside wheel circular path orb C becomes a smaller in proportion to the circumferential length of the outside wheel circular path orb D. Thus, in the present exemplary embodiment by increasing the speed difference between the inside and outside wheels as the rudder angle of the steered wheels 33a, 33b increases, a configuration is achieved in which smooth turning can be performed.

Furthermore, a configuration is adopted such that when the detected rudder angle θ of the rudder angle detector 17 exceeds steering level +4, namely exceeds the second rudder angle (±54°) and reaches a steering level from +5 to +7, then although the speed reduction coefficient for the left side, i.e. at the turn direction outside, remains a positive (+) value, the speed reduction coefficient for the right side, i.e. at the turn direction inside changes to a negative (−) value (see Table 1).

The controller 70 accordingly sets the target rotation speed as positive (+) for the left power control unit 354 on the turn direction outside, and sets a negative (−) target rotation speed, i.e. a target rotation speed in reverse rotation, for the right power control unit 353 on the turn direction inside (step C3-3 of FIG. 8). Reverse rotation control is accordingly performed in which the rotation directions of the left drive motor 352 and the right drive motor 351 are thereby reversed with respect to each other.

In this manner, a configuration is adopted in which the left and right driven wheels 33c, 33d are rotated at the same speed but opposite directions by the wheel driven at inside to the turn direction being reverse rotated when the rudder angle of steered wheels 33a, 33b is large, and more specifically, in the present exemplary embodiment, the left side speed reduction coefficient is set to 0.6 and the right side speed reduction coefficient is set to −0.6 for when the rudder angle detected by the rudder angle detector 17 corresponds to the steering level +7 (+78°<θ<+90°. This enables, as illustrated in FIG. 2, a turning center C of the vehicle chassis 30 to be moved past the position of the wheel driven at inside to the turn direction (the right driven wheel 33c) and positioned more toward the turn direction outside driven wheel (left driven wheel 33d) side. This enables the minimum turning radius of the mobile aerial work platform 2 to be significantly reduced.

Note that in the drive control described above a configuration has been described in which, by receiving the target rotation speeds from the controller 70, the left and right power control units 353, 354 respectively output power that corresponds to the received target rotation speeds to the drive motors 351, 352.

Figure 10:
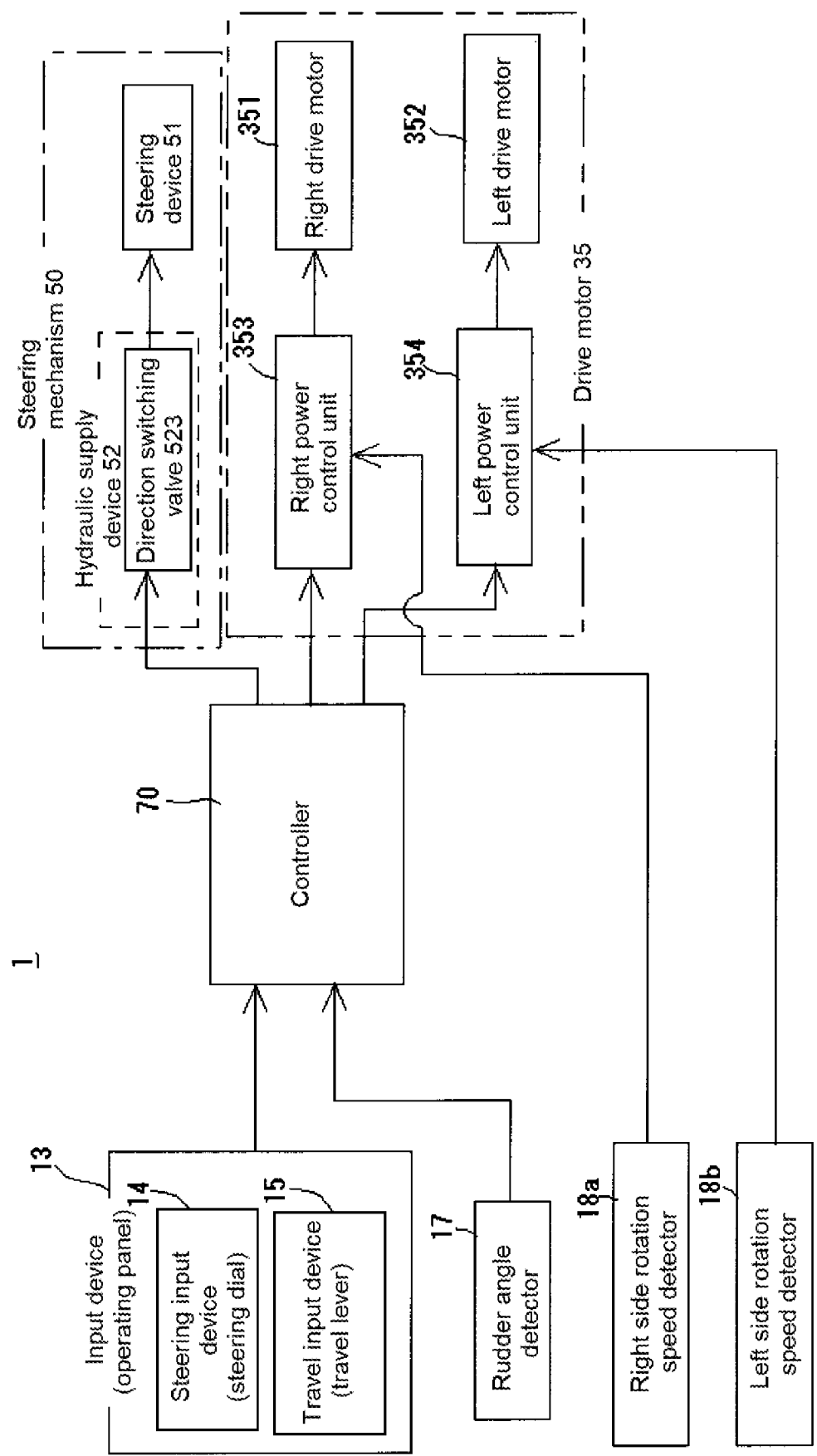
FIG. 10 is a block diagram of a different traction unit of the present invention.
Figure 11:
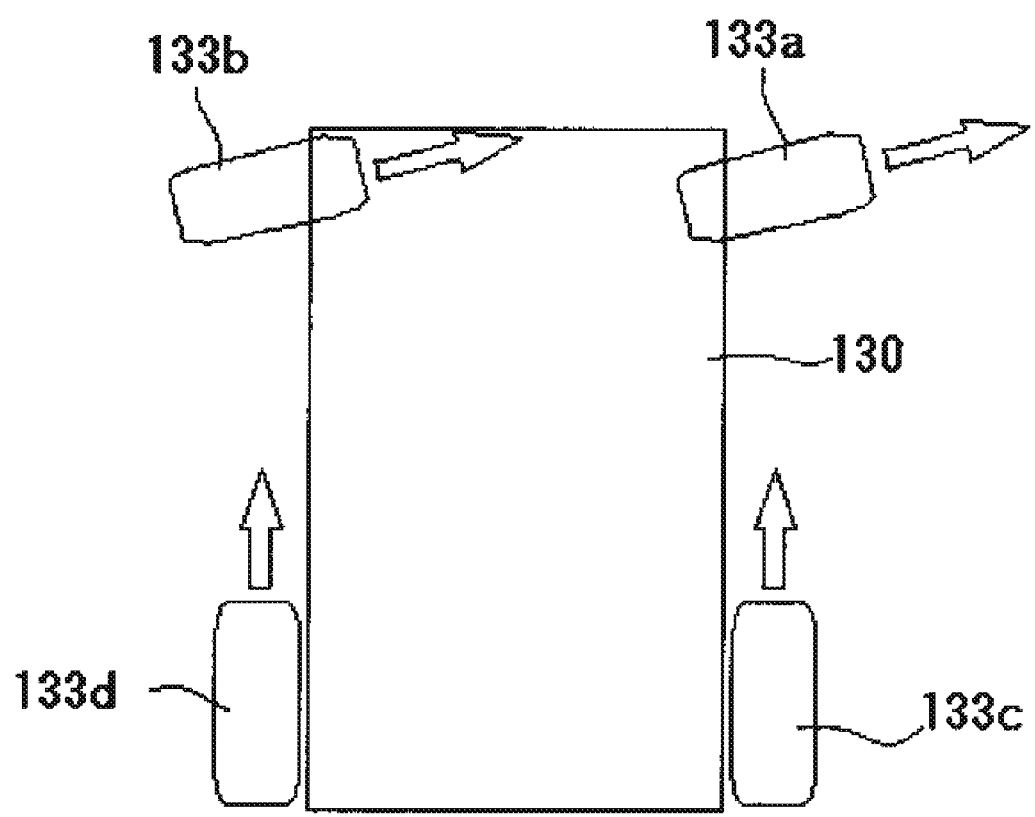
FIG. 11 is an explanatory diagram to explain travel directions of each wheel for a rudder angle approaching 90° (Related Art).

In contrast thereto, the travel control device 1 illustrated in FIG. 10 is further provided with a right side rotation speed detector 18a to detect the rotation speed of the right driven wheel 33c, and with a left side rotation speed detector 18b to detect the rotation speed of the left driven wheel 33d. In this configuration the right power control unit 353 controls the power output to the right drive motor 351 such that a difference between a detected rotation speed detected by the right side rotation speed detector 18a and a target rotation speed received from the controller 70 becomes "0". Moreover, the left power control unit 354 controls the power output to the left drive motor 352 such that a difference between a detected rotation speed detected by the left side rotation speed detector 18b and a target rotation speed received from the controller 70 becomes "0". A configuration may also be adopted so as to perform feedback control to control the rotation speeds of the drive motors 351, 352 based on the detected rotation speeds detected by the rotation speed detectors 18a, 18b.

According to the above configuration, it enables accurate control of the rotation speed of each of the driven wheels 33c, 33d and, for example, enables rotation torque of the driven wheel (outside wheel) positioned at the outside of the vehicle chassis 30 when turning to be prevented from becoming insufficient and resulting in the actual rotation speed as detected by the rotation speed detector falling below the target rotation speed, or enables rotation torque of the driven wheel (inside wheel) positioned at the inside of the turning vehicle chassis 30 when turning to be prevented from becoming excessive and resulting in the actual rotation speed as detected by the rotation speed detector becoming larger than the target rotation speed, thereby causing an increase in the turning radius due to the turning path of the mobile aerial work platform bulging outward. This enables an even greater improvement to be achieved in the turning capabilities of the mobile aerial work platform 2.

Other Modified Steering Control Example

In the steering control described above with reference to FIG. 6 and FIG. 7, the controller 70 sets the target rudder angle based on the rotation angle of the steering dial 14 with respect to the neutral position, acquires the detected rudder angle based on the detection signal of the rudder angle detector 17, and controls such that an operation signal is output to the direction switching valve 523 of the steering mechanism 50 so as to make the detected rudder angle match the target rudder angle (so that the difference therebetween becomes zero).

In contrast thereto, in the present exemplary embodiment, instead of the steering control described above based on the rotation angle of the steering dial 14 with respect to the neutral position, a configuration is adopted in which the controller 70 controls so as to output an operation signal to the direction switching valve 523 of the steering mechanism 50 based on the rotation direction of the steering dial 14 with respect to the neutral position, so as to steer the steered wheels 33a, 33b toward the rotation direction input by operation of the steering dial 14 while operation thereof is being continuously performed.

Figure 9:
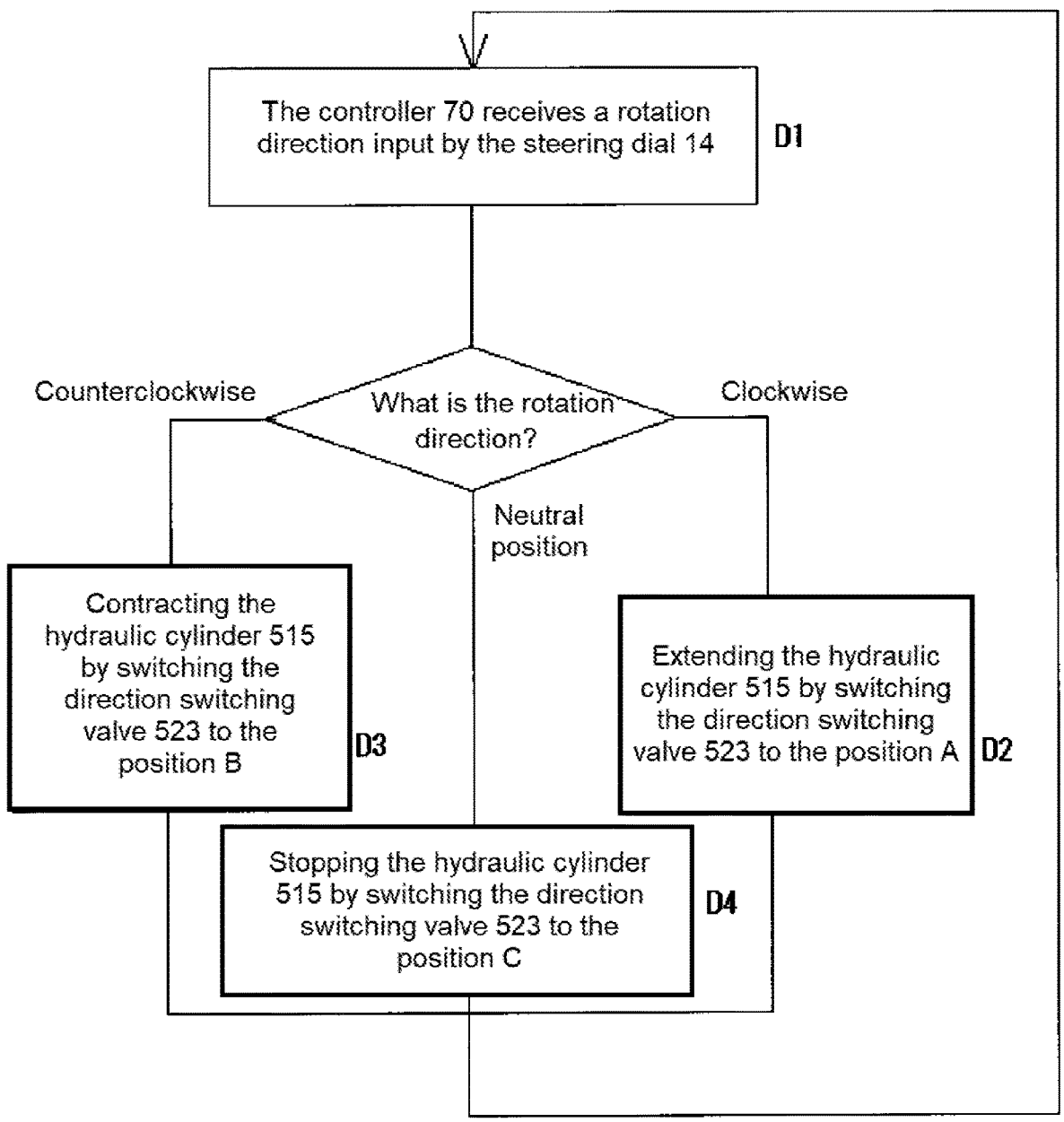
FIG. 9 is a flowchart illustrating steering control based on rotation direction of a steering dial.

More specifically, when the steering dial 14 is operated by an operator, the controller 70 receives as a "rotation direction" of whether or not the steering dial 14 has, by this operation, been displaced to a position on the clockwise side or on the counterclockwise side with respect to the neutral position (step D1 of FIG. 9).

When the controller 70 has received this rotation direction then, corresponding to the rotation direction, outputs an operation signal to switch the direction switching valve 523 to position A in FIG. 4 when the rotation direction is clockwise, thereby extending the hydraulic cylinder 515 and steering the steered wheels 33a, 33b clockwise (step D2 of FIG. 9). However, the controller 70 outputs an operation signal to switch the direction switching valve 523 to position B in FIG. 4 when the rotation direction is counterclockwise, thereby contracting the hydraulic cylinder 515 and steering the steered wheels 33a, 33b counterclockwise (step D3 of FIG. 9). When at the neutral position, the controller 70 outputs an operation signal to switch the direction switching valve 523 to position C in FIG. 4, thereby interrupting operating fluid supply to, and recovery from, the hydraulic cylinder 515 so as to stop the hydraulic cylinder 515, and to stop steering of the steered wheels 33a, 33b (step D4 of FIG. 9).

During operation the steered wheels 33a, 33b are accordingly steered toward the rotation direction being input by operation of the steering dial 14.

Note that even in cases in which the configuration is changed to perform steering control based on the rotation direction of the steering dial 14, drive control can still be performed using the same method as in the previous exemplary embodiment (see FIG. 8).

Namely, as illustrated in Table 1, the left and right target rotation speeds are respectively computed by multiplying the appropriate basic rotation speed by the respective left and right speed reduction coefficients corresponding to the detected rudder angle with respect to the straight ahead position based on the detection signal detected using the rudder angle detector 17. The left and right target rotation speeds are respectively output to the left and right power control units 353, 354, and power converted to correspond to the left and right target rotation speeds is respectively output to the left and right drive motors 351, 352. The left and right drive motors 351, 352 are rotated at their respective target rotation speeds, and equivalent speed control, differential control, and reverse rotation control is performed.

Thus in the present exemplary embodiment that performs steering control based on the rotation direction of the steering dial 14, the steering control adopted is different to the steering control described with reference to FIG. 6 and FIG. 7. However, similar control is performed for the drive control, and so the configuration of the present exemplary embodiment is similarly also able to significantly reduce the minimum turning radius of the mobile aerial work platform 2.

Note that instead of a configuration in which the controller 70 performs steering control based on the rotation angle of the steering dial 14 as described with reference to FIG. 6 and FIG. 7, configuration may include a setting to perform steering control that is solely based on the rotation direction of the steering dial 14 as in the present exemplary embodiment, and a setting to perform both steering control based on the rotation angle and steering control based on the rotation direction, with whichever one of these controls is performed being freely selectable.

DESCRIPTIONS OF REFERENCE NUMERALS

1 Travel control device
2 Mobile aerial work platform
10 Elevating deck
11 Guard fence
13 Input device (operating panel)
14 Steering input device (steering dial)
14a Marker
15 Travel input device (travel lever)
17 Rudder angle detector
18a Right side rotation speed detector
18b Left side rotation speed detector
20 Lift unit
30 Vehicle chassis
31 Vehicle body
32 Frame
33 Wheels
  33a Steered wheel (front wheel)
  33b Steered wheel (front wheel)
  33c Driven wheel (rear wheel)
  33d Driven wheel (rear wheel)
35 Drive motor
  351 Right drive motor
  352 Left drive motor
  353 Right power control unit
  354 Left power control unit
37 Chain
38, 39 Sprockets
50 Steering mechanism
51 Steering device
  511 Knuckle
  512 Kingpin
  513 Coupling pin
  514 Tie-rod
  515 Steering actuator
52 Hydraulic supply device
  521 Oil tank
  522 Hydraulic pump
  523 Direction switching valve
70 Controller
130 Vehicle chassis
133a Right steered wheel (front wheel)
133b Left steered wheel (front wheel)
133c Right driven wheel (rear wheel)
133d Left driven wheel (rear wheel)
C Turning center
E1 Extension line of shafts of rear wheels
E2, E3 Extension line of shafts of front wheels
orb A-orb D Circular paths

The invention claimed is:

1. A travel control method for a mobile aerial work platform including a vehicle chassis capable of travelling, wherein an elevating deck and a lift unit are mounted on the vehicle chassis, wherein the lift unit is configured to raise and lower the deck, and wherein a pair of steered wheels are mounted on the front end of the vehicle chassis, and wherein a pair of driven wheels are mounted on the rear end of the vehicle chassis, and wherein the mobile aerial work platform is configured to perform a turning action by steering the steered wheels, the travel control method comprising:

providing each of the driven wheels with respective and independently controlled drive motors;

independently controlling the rotation speed and rotation direction of each of the pair of driven wheels via the respective and independently controlled drive motors;

performing an equivalent speed control of the driven wheels, in cases in which a rudder angle of each of the steered wheels with respect to a straight ahead position is less than or equal to a predetermined first rudder angle, driving both of the drive motors such that the pair of driven wheels are driven in the same rotation direction and at the same rotation speed as each other;

performing a differential control of the driven wheels, in cases in which the rudder angle of each of the steered wheels exceed the first rudder angle but is less than or equal to a second rudder angle larger than the first rudder angle, driving the drive motors at a predetermined rotation speed difference such that a rotation speed of the inside driven wheel of a turn direction of the mobile aerial work platform is slower than a rotation speed of the outside driven wheel of the turn direction of the mobile aerial work platform, while the pair of driven wheels are continuously driven in the same rotation direction as each other; and performing a reverse rotation control of the driven wheels, in cases in which the rudder angle of each of the steered wheels exceeds the second rudder angle, driving the drive motors such that the inside driven wheel of the turn direction of the mobile aerial work platform is rotated in reverse with respect to the travel direction of the mobile aerial work platform.

2. The travel control method for the mobile aerial work platform according to claim 1, wherein during the differential control of the driven wheels and the reverse rotation control of the driven wheels, a rotation speed of the outside driven wheel of the turn direction of the mobile aerial work platform is reduced in speed as the rudder angle gets larger.

3. The travel control method for the mobile aerial work platform according to claim 1, wherein during the differential control of the driven wheels, the rotation speed difference is increased as the rudder angle gets larger.

4. The travel control method for the mobile aerial work platform according to claim 1, wherein during the reverse rotation control of the driven wheels, a reverse rotation speed of the inside driven wheel of the turn direction of the mobile aerial work platform is increased as the rudder angle gets larger.

5. The travel control method for the mobile aerial work platform according to claim 1, wherein the rudder angle of each of the steered wheels employs a rudder angle of the inside steered wheel of the turn direction of the mobile aerial work platform.

6. A travel control device for a mobile aerial work platform including a vehicle chassis capable of travelling, wherein an elevating deck and a lift unit are mounted on the vehicle chassis, wherein the lift unit is configured to raise and lower the deck, and wherein a pair of steered wheels are mounted on the front end of the vehicle chassis, and wherein a pair of driven wheels are mounted on the rear end of the vehicle chassis, and wherein the mobile aerial work platform is configured to perform a turning action by steering the steered wheels, the travel control device comprising:
   a steering input device receiving a steering direction in which to face the steered wheels;
   a steering mechanism equipped with a steering actuator steering the steered wheels;
   a travel input device receiving mobile aerial work platform travel direction commands of forward, backward, and stop, and receiving a travel speed employed during forward and backward travel;
   a drive unit equipped with a pair of drive motors to independently driving each of the driven wheels; and
   a controller controlling the steering mechanism and the drive unit, wherein the controller:
      controls the steering mechanism so that the steering actuator steers the steered wheels with steering corresponding to operation of the steering input device; and also
      controls the drive unit according to input performed through the travel input device in accordance with a rudder angle of the steered wheel with respect to a straight ahead position,
      wherein control of the drive unit by the controller causes the drive unit to:
         execute an equivalent speed control of the driven wheels, in cases in which the rudder angle of each of the steered wheels is less than or equal to a predetermined first rudder angle, driving both of the drive motors such that the pair of driven wheels are driven in a same rotation direction and at a same rotation speed in accordance with the forward travel direction and the travel speed received by the travel input device;
         execute a differential control of the driven wheels, in cases in which the rudder angle of each of the steered wheels exceeds the first rudder angle but is less than or equal to a second rudder angle larger than the first rudder angle, driving the drive motors at a predetermined rotation speed difference such that a rotation speed of the inside driven wheel of a turn direction of the mobile aerial work platform is slower than a rotation speed of the outside driven wheel of the turn direction of the mobile aerial work platform, while the pair of driven wheels are continuously driven in the same rotation direction as each other; and
         execute a reverse rotation control of the driven wheels, in cases in which the rudder angle of each of the steered wheels exceeds the second rudder angle, driving the drive motors such that the inside driven wheel of the turn direction of the mobile aerial work platform alone is rotated in reverse with respect to the travel direction of the mobile aerial work platform.

7. The mobile aerial work platform travel control device according to claim 6, further comprising:
   a rudder angle detector detects a rudder angle of each of the steered wheels with respect to a straight ahead position; and
   wherein the controller controls the drive unit using a detected rudder angle detected by the rudder angle detector as the rudder angle of each of the steered wheels.

8. The mobile aerial work platform travel control device according to claim 7, wherein:
   during the differential control of the driven wheels and the reverse rotation control of the driven wheels, the controller controls the drive unit such that the rotation speed of the outside driven wheel of the turn direction of the mobile aerial work platform is lowered as the rudder angle of the steered wheels gets larger.

9. The mobile aerial work platform travel control device according to claim 7, wherein:
   during the differential control of the driven wheels, the controller controls the drive unit such that the rotation speed difference is increased as the rudder angle of the steered wheels wheel gets larger.

10. The mobile aerial work platform travel control device according to claim 7, wherein:
   during reverse rotation control of the driven wheels, the controller controls the drive unit such that a reverse rotation speed of the inside driven wheel of the turn direction of the mobile aerial work platform is increased as the rudder angle of the steered wheels gets larger.

11. The mobile aerial work platform travel control device according to claim 7, wherein:
   the steering input device is a steering dial; and
   the controller controls the steering mechanism such that a rotation angle of the steering dial with respect to a neutral position is caused to match a rudder angle of inside steered wheel of the turn direction of the mobile aerial work platform with respect to a straight ahead position.

12. The mobile aerial work platform travel control device according to claim 6, wherein:
   the steering input device receives input of a rudder angle in which to face the steered wheels with respect to a straight ahead position; and
   the controller controls the drive unit using the rudder angle received by the steering input device as the rudder angle of the steered wheels.

13. The mobile aerial work platform travel control device according to claim 12, wherein:
   during the differential control of the driven wheels and the reverse rotation control of the driven wheels, the controller controls the drive unit such that the rotation speed of the outside driven wheel of the turn direction of the mobile aerial work platform is lowered as the rudder angle of the steered wheels gets larger.

14. The mobile aerial work platform travel control device according to claim 12, wherein:
during differential control of the driven wheels, the controller controls the drive unit such that the rotation speed difference is increased as the rudder angle of the steered wheels gets larger.

15. The mobile aerial work platform travel control device according to claim 12, wherein:
during reverse rotation control of the driven wheels, the controller controls the drive unit such that a reverse rotation speed of the inside driven wheel of the turn direction of the mobile aerial work platform is increased as the rudder angle of the steered wheels gets larger.

16. The mobile aerial work platform travel control device according to claim 12, wherein:
the steering input device is a steering dial; and
the controller controls the steering mechanism such that a rotation angle of the steering dial with respect to a neutral position is caused to match a rudder angle of inside steered wheel of the turn direction of the mobile aerial work platform with respect to a straight ahead position.

17. The mobile aerial work platform travel control device according to claim 6, wherein:
during the differential control of the driven wheels and the reverse rotation control of the driven wheels, the controller controls the drive unit driving the drive motors such that the rotation speed of the outside driven wheel of the turn direction of the mobile aerial work platform is lowered as the rudder angle of the steered wheels gets larger.

18. The mobile aerial work platform travel control device according to claim 6, wherein:
during the differential control of the driven wheels, the controller controls the drive unit such that the rotation speed difference is increased as the rudder angle of the steered wheels gets larger.

19. The mobile aerial work platform travel control device according to claim 6, wherein:
during the reverse rotation control of the driven wheels, the controller controls the drive unit such that the reverse rotation speed of the inside driven wheel of the turn direction of the mobile aerial work platform is increased as the rudder angle of the steered wheels gets larger.

20. The mobile aerial work platform travel control device according to claim 6, wherein:
the steering input device is a steering dial; and
the controller controls the steering mechanism such that a rotation angle of the steering dial with respect to a neutral position is caused to match a rudder angle of the inside steered wheel of the turn direction of the mobile aerial work platform with respect to a straight ahead position.

* * * * *